US011086838B2

(12) United States Patent
Masson et al.

(10) Patent No.: US 11,086,838 B2
(45) Date of Patent: Aug. 10, 2021

(54) GENERATING COMPACT DATA STRUCTURES FOR MONITORING DATA PROCESSING PERFORMANCE ACROSS HIGH SCALE NETWORK INFRASTRUCTURES

(71) Applicant: Datadog, Inc., New York, NY (US)

(72) Inventors: Charles-Philippe Masson, Paris (FR); Jee Eun Rim, Chicago, IL (US); Homin Lee, Jersey City, NJ (US)

(73) Assignee: Datadog, Inc., New York, NY (US)

(*) Notice: Subject to any disclaimer, the term of this patent is extended or adjusted under 35 U.S.C. 154(b) by 62 days.

(21) Appl. No.: 16/271,606

(22) Filed: Feb. 8, 2019

(65) Prior Publication Data
US 2020/0257670 A1   Aug. 13, 2020

(51) Int. Cl.
G06F 16/22   (2019.01)
H04L 12/24   (2006.01)
H04L 12/26   (2006.01)

(52) U.S. Cl.
CPC ........ G06F 16/2272 (2019.01); H04L 41/142 (2013.01); H04L 43/045 (2013.01); H04L 43/16 (2013.01)

(58) Field of Classification Search
CPC .. G06F 16/2272; G06F 16/2264; G06F 16/22; G06F 16/285; G06F 16/9532
USPC .................................................. 707/693, 737
See application file for complete search history.

(56) References Cited

U.S. PATENT DOCUMENTS

| | | | | |
|---|---|---|---|---|
| 8,380,758 | B1* | 2/2013 | Stephens | G06F 9/45512 707/803 |
| 8,577,829 | B2* | 11/2013 | Subrahmanyam | G06N 7/005 706/52 |
| 8,620,928 | B1* | 12/2013 | Walton | G06F 40/211 707/748 |
| 9,589,183 | B2* | 3/2017 | Brown | G06K 9/78 |
| 9,600,479 | B2* | 3/2017 | Motoyama | G06F 16/93 |
| 9,626,414 | B2* | 4/2017 | Kanjirathinkal | H04L 63/14 |
| 9,697,316 | B1 | 7/2017 | Taylor et al. | |
| 2003/0033403 | A1 | 2/2003 | Rhodes | |
| 2006/0184529 | A1* | 8/2006 | Berg | G06F 11/0784 |
| 2008/0147588 | A1* | 6/2008 | Leffingwell | G06F 16/951 706/48 |
| 2009/0327269 | A1* | 12/2009 | Paparizos | G06F 16/3322 |
| 2014/0006010 | A1* | 1/2014 | Nor | G06F 40/211 704/9 |
| 2014/0012847 | A1* | 1/2014 | Barnes, II | G06F 21/562 707/737 |

(Continued)

OTHER PUBLICATIONS

International Search Report and Written Opinion for Intl App No. PCT/US2020/016933, dated May 27, 2020, (18 pages).

*Primary Examiner* — Shahid A Alam
(74) *Attorney, Agent, or Firm* — Fish & Richardson P.C.

(57) ABSTRACT

A compact data structure generation engine can be used to generate a compact data structure that represents performance data for high-scale networks. The compact data structure representing the performance data can be used to monitor the operation performed on or by a computer system to identify potentially anomalous conditions. In response, a corrective action can be taken to address the issue. This can be useful, for example, in improving the efficiency, effectiveness, and reliability of the computer system during operation.

29 Claims, 21 Drawing Sheets

(56) References Cited

U.S. PATENT DOCUMENTS

| | | | |
|---|---|---|---|
| 2014/0096146 A1* | 4/2014 | Maor | G06F 11/3419 |
| | | | 719/318 |
| 2014/0325254 A1* | 10/2014 | Mani | G06F 16/285 |
| | | | 714/2 |
| 2016/0036677 A1* | 2/2016 | McNutt | H04L 43/0876 |
| | | | 709/224 |
| 2018/0089286 A1* | 3/2018 | Marquardt | G06F 16/2228 |

* cited by examiner

GENERATING COMPACT DATA STRUCTURES FOR MONITORING DATA PROCESSING PERFORMANCE ACROSS HIGH SCALE NETWORK INFRASTRUCTURES

TECHNICAL FIELD

The disclosure relates to monitoring computer systems to identify anomalous operation, and more specifically to generating compact data structures representative of computing performance metrics of the computer systems to facilitate identification of the anomalous operation.

BACKGROUND

Computer systems can be used to transmit, receive, and/or process data. For instance, a server computer system can be used to receive and store content (e.g., web content, such as a web page), and make the content available to one or more client computer systems. Upon receiving a request for the content from a client computer system, the server computer system can retrieve the requested content, and transmit the content to the client computer system to fulfill the request.

SUMMARY

In an aspect, a method includes receiving, at a server device, a computing performance data sequence from the one or more computing devices, the computing performance data sequence including a plurality of performance metric values that represent a performance metric associated with operations performed by the one or more computing devices. The method includes generating, by the server device, a compact data structure representative of the computing performance data sequence and having an accuracy parameter $\alpha$. In some implementations, generating the compact data structure includes, for a first performance metric value in the plurality of performance metric values, defining a first range. Boundaries of the first defined range are set as a function of the first performance metric value. Generating the compact data structure includes defining a first index value associated with the first defined range and incrementing a first count value characterizing a number of performance metric values within the first defined range. Generating the compact data structure includes, for each remaining performance metric value in the plurality of performance metric values, identifying whether the remaining performance metric value is within an existing defined range. When the remaining performance metric value is within the existing defined range, the method includes incrementing a count value characterizing a number of performance metric values within the existing defined range. When the remaining performance metric value is not within any existing defined range, the method includes defining a new range, wherein boundaries of the new defined range are set as a function of the remaining performance metric value, defining a new index value associated with the new defined range, and incrementing a count value characterizing a number of performance metric values within the new defined range. In some implementations, the method includes storing the compact data structure in an electronic data storage device with less memory than would be required to store the computing performance data sequence. In some implementations, the method includes deriving a statistical metric of the compact data structure and outputting the statistical metric of the compact data structure as representative of performance of the one or more computing devices.

Implementations of this aspect can include one or more of the following features.

In some implementations, each index value is defined as $i=\log_\gamma(x)$ for a corresponding performance metric value, x, and $\gamma=1+2\alpha$, and each range is defined as $\gamma^{i-1}<x\leq\gamma^i$. In some implementations, the value of i is approximated to an integer value. For example, a ceiling function can be applied to the index value to approximate the index value to an integer value.

In some implementations, the compact data structure is a first compact data structure and the method further includes merging, by the server device, the first compact data structure with a second compact data structure having the accuracy parameter $\alpha$. In an aspect, merging includes, for each defined range of the first compact data structure that shares an index value with a defined range of the second compact data structure, adding a first count value associated with the defined range of the first compact data structure to a second count value of the defined range of the second compact data structure to generate a third count value, associating the third count value with the defined range of the first compact data structure, and discarding the defined range of the second compact data structure.

In some aspects, each of the first compact data structure and the second compact data structure comprises at least 500,000 values, and the merging takes less than 5 μs.

In some implementations, the method includes determining a memory constraint for storing the compact data structure. The method includes, responsive to determining, setting a maximum number of defined ranges for the compact data structure.

In some implementations, the method includes determining that a number of defined ranges of the compact data structure has reached a maximum number of defined ranges. In some aspects, responsive to determining that the maximum number of defined ranges has been reached, the method includes determining a first particular range having a smallest index value and a second particular range having a second smallest index value and combining the first particular range and the second particular range into a third particular range. The combining includes adding a first particular count of the first particular range to a second particular count of the second particular range to generate a third particular count associated with the third particular range.

In some implementations, a ratio of a total number of performance metric values to a total number of distinct defined ranges in the compact data structure is greater than 500,000:1.

In some implementations, the performance metric comprises a measure of server response time by the server device in response to requests for data by the one or more computing devices.

In an aspect, the compact data structure is generated independent of identifying a performance metric value as a minimum or a maximum of the computing performance data sequence.

In some implementations, the method includes receiving a request for the statistical metric of the compact data structure and generating, for each index value of the compact data structure, a graphical representation of a count value associated with the respective index value.

In some implementations, each defined range of the compact data structure is associated with a corresponding percentile rank value, and the percentile rank value is determined based on the count value associated with each defined range.

In some implementations, the method includes receiving a request for a percentile rank of at least one performance metric value and generating a graphical representation comprising the percentile rank.

In some implementations, storing the compact data structure in the electronic data storage device with less memory than would be required to store the computing performance data sequence comprises a reduction in memory corresponding to a ratio of n:log(n), wherein n is a number of the performance metric values.

Other implementations are directed to systems, devices and non-transitory, computer-readable mediums (e.g., for performing the methods described herein).

The implementations described herein can provide various technical benefits. For instance, the techniques described herein enable a monitoring system to monitor the performance of one or more computer systems (e.g., of a high-scale network) more efficiently and quickly. For example, in high-scale networks (e.g., data centers, server farms, etc.) there can be dozens, hundreds, thousands, etc. of computing systems requesting data from the computing systems of the high-scale network over time. Identifying statistical anomalies with data processing performance (e.g., relatively high latencies in response to data requests) for a particular computing system of the high-scale network in real-time or near real-time can be difficult. This is because of the challenge in aggregating the large amount of performance data (e.g., measured latencies in responding to data requests) from across the network and evaluating the aggregated performance data to identify any statistical anomalies.

To overcome this problem, for example, the techniques described herein provide a compact data structure including a summary of data that represents performances of the one or more computer systems across the high-scale network. The summary data includes a small amount of data relative to the amount of the performance data measured from the one or more computing systems. Additionally, the summary includes a statistical representation of a distribution of the performance data, including approximated values of the performance data at each percentile of the distribution. The summary of the compact data structure includes an approximation accuracy within a specified threshold accuracy, so that the summarized data include an accurate statistical representation of the performance data that are summarized in the compact data structure.

The compact data structure thus provides an accurate statistical representation of the performance data in a fraction of the size of the performance data. The summary data included in the compact data structure is more manageable than the performance data itself, and can more easily be stored, copied, transmitted, etc. than the performance data. Furthermore, the summary data of the compact data structure can be easily merged with summary data from other computing systems in the high-scale network while preserving the statistical representations of the summary data and the other summary data.

The techniques herein enable a monitoring system to identify statistical anomalies, and thus anomalous operation in a computer system, in a quicker and more efficient manner, without reduction in accuracy. As examples, using these techniques, a monitoring system can operate using less memory and fewer computational resources (e.g., lower processor utilization) than might otherwise be required with conventional techniques. This enables a monitoring system to monitor a single computer system more effectively, such that it can devote resources to other tasks. This also enables a system to monitor a greater number of computer systems concurrently than might otherwise be possible with conventional techniques.

The details of one or more embodiments are set forth in the accompanying drawings and the description below. Other features and advantages will be apparent from the description and drawings, and from the claims.

DETAILED DESCRIPTION

Figure 1:
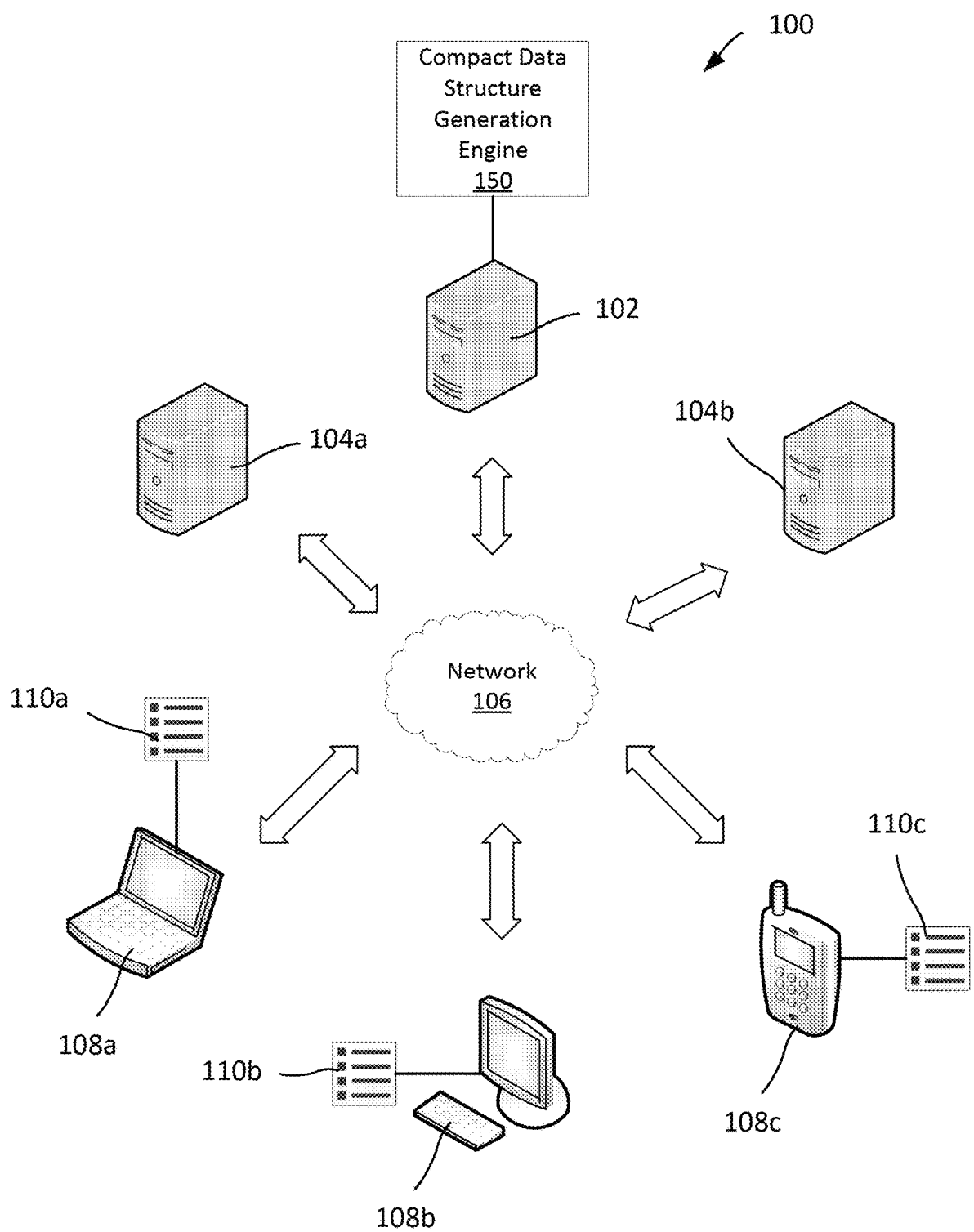
FIG. 1 is a diagram of an example system for monitoring the performance of one or more computer systems.

A data processing system described herein is configured to generate compact data structures to summarize data for monitoring operations of one or more computer systems of a high-scale network (e.g., data centers, server farms, etc.). Generally, for a high-scale network, there can be dozens, hundreds, thousands, etc. of computing systems in the network. The computing systems can be performing a very high number (e.g., millions) of operations over a period of time. The data processing system (and/or the computing systems themselves) can measure various metrics of the operations of the computing systems to obtain performance data. For example, the performance data, described in detail below, can include a measurement of response time by a computing system to a request for data (e.g., a latency, response time, etc.), a number of requests handled by the computing system during a period of time, or any other measurement of operations of the computing system in the high-scale network.

The data processing system monitors the operations performed on or by a computer system to monitor the performance of the computing system and to identify potentially anomalous conditions. This can be useful, for example, in improving the efficiency, effectiveness, and reliability of the computer system during operation. For example, the operations performed on or by the computer system can be monitored to identify periods of time in which the computer system is experiencing a higher than expected load, consuming an unexpected amount of computational resources, and/or behaving in an unexpected manner. In response, a corrective action can be taken to address the issue. As an example, a notification can be transmitted to one or more users (e.g., one or more administrators of the computer system) to alert them of a possible problem. As another example, additional computer systems can be activated to alleviate the load on the computer system. As another example, the computer system can be analyzed to identify and fix one or more malfunctioning components, modules, or processes that are anomalous.

Monitoring data processing performance to identify an anomaly (e.g., relatively high latencies in response to data requests) for a particular computing system of the high-scale network in real-time or near real-time can be difficult when using the performance data itself. To identify a potential anomaly, or even monitor performance of the high-scale network generally, a statistical characteristic of the performance data is often requested by a system operator. For example, the performance data can include response times to data requests from the high-scale network. To identify whether the system is operating as desired, an operator of the high-scale network may request statistical metric data about the performance data, including mean response time, a median response time, a visualization of a distribution of response times, etc. for the high-scale network or for a particular computing system in the high-scale network. The large amount of performance data for the high-scale network can be prohibitive for analysis to identify statistical metric data from the performance data itself.

Furthermore, to provide the statistical data, the performance data is aggregated from each computing system. Aggregating the performance data from across the network and evaluating the aggregated performance data to identify any statistical anomalies is difficult to accomplish in real-time or near real time because of the amount of data to be processed. Thus, quickly identifying anomalies and responding to the anomaly with a corrective action in the high-scale network can also be difficult. For example, it may be difficult to identify lengthy delays in responding to data requests for some computing systems in time to take corrective action.

An example data processing system 100 for generating compact data structures for monitoring the performance of computer systems 102, 104a and 104b is shown in FIG. 1. The system 100 includes a compact data structure generation engine 150 maintained on a server system 102 that includes one or more server computers. In some cases, the system 100 can be used to generate compact data structures (e.g., data sketches) to identify anomalies across high-scale network infrastructures.

The system 100 can overcome the problem of processing large amounts of performance data in a high-scale network by generating summary data of the performance data and operating on the summary data. The summary data is generated by the server system 102 in the form of the compact data structure.

The server system 102 generates the compact data structure including the summary data that represents performances of the one or more computer systems 104a, 104b across the high-scale network and even and even server system 102 itself. The compact data structure includes a small amount of data relative to the amount of data measured from the one or more computing systems. Typically, a number of elements n of the performance data (or other data sequence) received at the server system 102 can be reduced according to a ratio approximately n/log(n), although other ratios are possible.

The compact data structure (described in detail with respect to FIG. 3) includes a statistical representation of the performance data that preserves the statistical metrics of the performance data. Values of the statistical metrics are approximated with an approximation accuracy within a specified threshold accuracy, and stored in subsets (e.g., referred to as ranges or buckets) that are assigned a value representative of the values in that subset. However, for many applications, it is important to ensure that a relative error of the approximation (e.g., a percentage difference between the approximated value and the actual value) is within the threshold accuracy. This is referred to as a relative accuracy. Conventional methods for summarizing data typically preserve rank in the statistical distribution (e.g., a statistical percentile of the performance value in the distribution) within a threshold rank accuracy (e.g., a distance between the approximated rank of the performance value in the summary from the actual rank of the performance value in the performance data). For example, to identify latency problems for web servers, the rank accuracy can be misleading, because there can be large relative differences between proximate percentiles in the distribution. In one example, a large majority of response times from a server in response to requests for data from other computing system can be approximately a few milliseconds. However, a few response times may be approximately seconds, or tens of seconds. The outliers may all be within a $99^{th}$ percentile of the distribution of response times. Conventional techniques for generating data summaries might ensure that each of these response times (e.g., 1 second, 10 seconds, 20 seconds) is represented in the $99^{th}$ percentile range. However, a system operator might wish to identify the systems reporting greater than 5-second response times. Because the vast majority of data are on the order of milliseconds, the distinction between 1 second response times and 10 second response times can be lost when preserving rank error.

For example, as the performance values are sorted into ranges representing the performance values, the ranges are static and chosen to represent a particular percentile group of the performance data. To perform this summary, conventional systems typically must have some information about the data being summarized, such as a total number of values to be summarized, a greatest value, and a smallest value, and so forth. This requires processing overhead before the summarization process can begin. Furthermore, preserving rank value rather than relative value can be insufficient for many applications in a high-scale network.

In contrast, the system 100 described herein generates compact data structures that preserve relative error, even for distributions with outliers that may be orders of magnitude different in value than the vast majority of the data values. Relative error is preserved by using dynamic values for the ranges to which each of the performance values are assigned to approximate the performance values. In some implementations, the values of boundaries of the ranges are calculated based on the performance value being summarized in the compact data structure at the time of summarization. Thus, no prior knowledge of the performance data, such as the highest and lowest values, the number of values, etc. is required in advance of the generation of the compact data structure, reducing processing overhead. The number of ranges into which the performance data is divided is thus dependent on the distribution of the performance data itself. The number of ranges is thus independent of the values of the performance data, and the number of ranges does not need to be determined in advance of the generation of the compact data structure.

In an example, the compact data structure is configured to approximate performance data including values representing response times. The response times each represent a time taken by a server system (e.g., a web server) to respond to a request for data (e.g., a search query) from a user system (e.g., a personal computer). Each request for data is monitored and associated with a response time. The measured response times can be input into a compact data structure by the server system or sent to another system (e.g., a system-wide data aggregator) for inputting into a compact data structure. As the server system receives additional requests, the server system adds additional values of the response times to one of the ranges (or a newly defined range) of the compact data structure.

For example, the compact data structure described herein approximates the response times within a percentage of their actual values (e.g., 1 second, 5 seconds, 10 seconds, etc.) while preserving the statistical metrics of the response times. This enables the system 100 to quickly identify how many response times are approximately 5 seconds, which may be annoying to a user, and 20 seconds, which may cause the user to abandon the request for data. The system 100 can still determine a mean response time, median response time, etc.

The compact data structure thus includes an accurate statistical representation of the performance data that are summarized in the compact data structure. The relative accuracy a of the approximations of the compact data structure can be defined to be any percentage value (e.g., 1%, 0.05%, 0.01%, etc.). Generally, relatively larger thresholds enable the data structure generation engine 150 to generate a compact data structure with a relatively smaller data footprint, as described below. While performance data including response times to data requests is used throughout this description as an example of data that can be handled by the data structure generation engine 150, the data structure generation engine can generate compact data structures related to any data sequence for maintaining the statistical metrics of that data sequence within a relative error threshold.

The compact data structure generation engine 150 of the server system 102, by generating the compact data structure, thus provides an accurate statistical representation of the performance data in a fraction of the size of the performance data. The data included in the compact data structure is more manageable than the performance data itself, and can more easily be stored, copied, transmitted, presented, etc. than the performance data itself. The data included in the compact data structure has the same statistical metrics as the performance data, and each approximated value in the compact data structure is within a specified percentage of the actual performance value it represents.

Furthermore, the server system 102 can easily merge data of the compact data structure of a computing system 104a with data from other compact data structures of other computing systems (e.g., computing system 104b) in the high-scale network while preserving the statistical representations of the summary data and the other summary data. Operations that can be performed on the data of the compact data structures (e.g., merging, deleting, etc.) are described below in reference to FIG. 5.

The server system 102 is communicatively connected to the computer systems 104a and 104b through a network 106. The computer systems 104a and 104b each can include, but are not limited to, e.g., one or more server computers. The computer systems 104a and 104b can be configured to transmit, receive, and/or process data. For instance, in some cases, the computer systems 104a and 104b can be web servers configured to receive and store content (e.g., web content, such as a web page), and make the content available to one or more other computer systems (e.g., client computer systems 108a-c). Upon receiving a request (e.g., from one of the client computer systems 108a-c), the computer systems 104a and 104b can retrieve the requested content, and transmit the content to the requesting computer system to fulfill the request. In some cases, the computer systems 104a and 104b can be owned, operated, and/or maintained by parties different from those that own, operate, and/or maintain the server system 102.

The server system 102 is also communicatively connected to the client computer systems 108a-c through the network 106. Each client computer system 108a-c includes a respective user interface 110a-c. Users can interact with the user interfaces 110a-c to view data (e.g., data on the server systems 102 and the engine 150, data on the computer systems 104a and 104b, and/or data on other the client computer systems 108a-c). Users can also interact with the user interfaces 110a-c to transmit data to other devices (e.g., to the server system 102 and the engine 150, to the computer systems 104a and 104b, and/or to the other client computer systems 108a-c). Users can interact with the user interfaces 110a-c to issue commands (e.g., to the server system 102, to the computer systems 104a and 104b, and/or to the other client computer systems 108a-c). In some implementations, a user can install a software application onto a client computer system 108a-c in order to facilitate performance of these tasks.

A client computer system 108a-c can be any electronic device that is used by a user to view, process, transmit and receive data. Examples of the client computer systems 108a-c include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 106. The client computer systems 108a-c can include devices that operate using one or more operating system (e.g., Microsoft Windows, Apple OSX, Linux, Unix, Android, Apple iOS, etc.) and/or architectures (e.g., x86, PowerPC, ARM, etc.) In some implementations, one or more of the client computer systems 108a-c need not be located locally with respect to the rest of the system 100, and one or more of the client computer systems 108a-c can be located in one or more remote physical locations.

The network 106 can be any communications network through which data can be transferred and shared. For example, the network 106 can be a local area network (LAN) or a wide-area network (WAN), such as the Internet.

The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

The server system 102 and the computer systems 104a, and 104b are each illustrated as a respective single component. However, in practice, each can be implemented on one or more computing devices. A server system 102 or a computer system 104a or 104b can be, for instance, a single computing device that is connected to the network 106. In some implementations, a server system 102 or a computer system 104a or 104b can include multiple computing devices that are connected to the network 106. For instance, the server system 102 can include several computing devices, and the engine 150 can be distributive on one or more of these computing devices. In some implementations, a server system 102 or a computer system 104a or 104b can be need not be located locally to the rest of the system 100, and portions of a server system 102 or a computer system 104a or 104b can be can be located in one or more remote physical locations.

Figure 2:
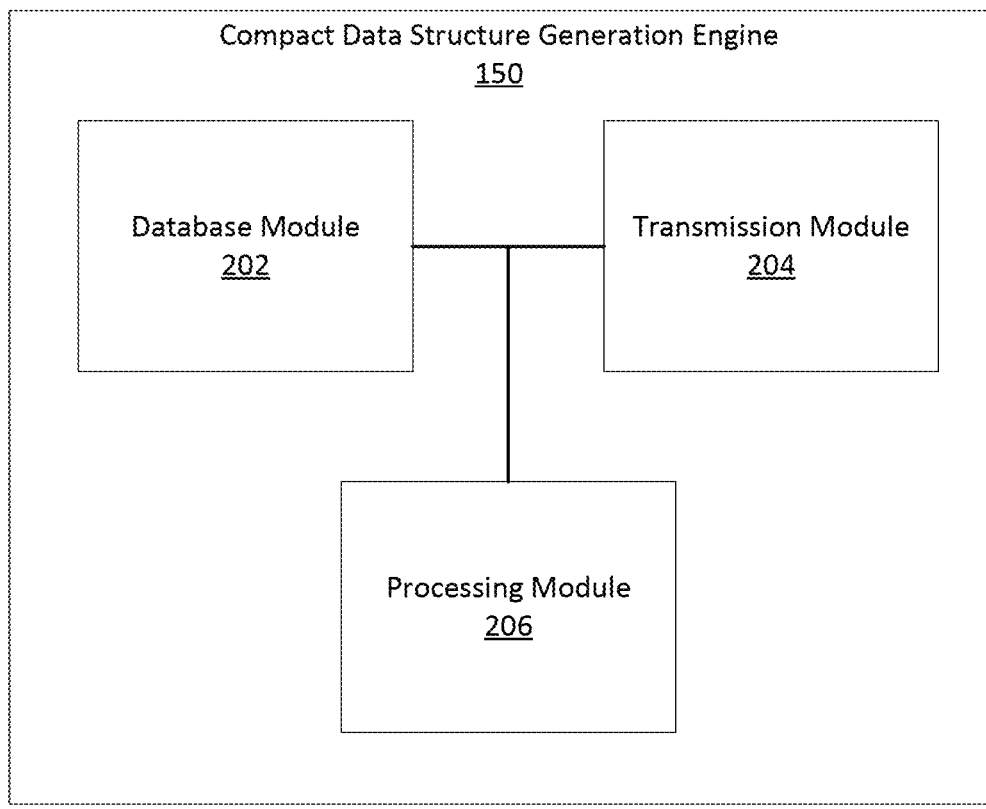
FIG. 2 is a diagram of an example data structure generation platform.

FIG. 2 shows various aspects of the engine 150. The engine 150 includes several modules that perform particular functions related to the operation of the system 100. For example, the engine 150 can include a database module 202, a transmission module 204, and a processing module 206.

In some implementations, the database module 202 stores information related to one or more users of the system 100. As example, the database module 202 can store information regarding a user's identity credentials (e.g., user name and password), contact information (e.g., e-mail address, physical address, phone number, and so forth), preferences (e.g., system preferences).

Further, in some implementations, the database module 202 is configured to store the performance data associated with operations performed on or by the computer systems 104a and 104b. For example, metrics can include a number of incoming requests to a particular computer system 104a or 104b over a period of time (e.g., requests to retrieve data, requests to process data, etc.). As another example, metrics can include an amount of computational resources being consumed by a particular computer system 104a or 104b over a period of time (e.g., a percentage of the computer system's processors' that is being utilized, an amount of data that is being written to the computer systems' data storage devices, an amount of data that is being transmitted or received using the computer systems' network connection, etc.). As another example, performance data can include an amount of time that a particular computer system 104a or 104b takes to fulfill one or more requests (e.g., latency). As another example, metrics can include a number of users that are accessing a service provided by the computer system 104a or 104b over a period of time.

In some cases, performance data may be related to one or more particular functions of the computer systems 104a and 104b. As an example, in some cases, the computer system 104a or 104b can configured to present a travel website to one or more users. Users can interact with the travel website, for example, to search for travel options (e.g., search for available tickets for travel), make reservations for travel (e.g., purchase tickets), and review content (e.g., photos, audio, videos, etc.). Example performance data can include a number of searches performed by users, a number of reservations created, a number of photos review, and so forth.

As another example, other types of data besides performance data can be stored in the database module 202 for summarization by the compact data structure generation engine 150. For example, the computer system 104a or 104b can be configured to monitor demographics of a customer base of a retail firm. For example, the data summarized by the compact data structure generation engine 150 can include counts of geographic locations of customers, a number of transaction per customer, rewards points held by customers, amount of money spent by customers, revenue at each store, or any other such data.

Although example data are described herein, these are merely illustrative examples. In practice, other data also can be used, either in addition to or instead of those described herein.

In some cases, the performance data can be represented in the form of time-series data. For example, the performance data can include a sequence of data items, each indicating a measured value of a particular performance metric at a particular point in time. Further, each data item can include a corresponding time stamp indicating the time at which the measured value was obtained. In some cases, the data can include a series of measurements obtained periodically over a period of time (e.g., once a second, once a minute, once an hour, or any other frequency). In some cases, the performance data can include a series of measurements obtained continuously, intermittently, or according to some other pattern.

In some cases, the performance data can be measured by the computer system 104a and 104b (e.g., using one or more computer agents deployed on the computer systems 104a and 104b) and transmitted to the engine 150 for storage in the database module 202. Here, a computer agent can refer to any software or hardware required for obtaining the performance data. The computer systems 104a and 104b can measure one or more performance values over a period of time (e.g., continuously, periodically, intermittently, or according to some other pattern), and transmit the measurements to the engine 150 for storage in the database module 202.

Although different examples of information are described above, these are merely illustrative. In practice, the database module 202 can store any information related to the users of the engine 150, any information related to the computer systems 104a and 104b, or any other information pertaining to the engine 150.

The transmission module 204 allows for the transmission of data to and from the engine 150. For example, the transmission module 204 can be communicatively connected to the network 106, such that it can transmit data to the computer systems 104a and 104b and/or the client computer systems 108a-c, and receive data from the computer systems 104 and 104b and/or the client computer systems 108a-c via the network 106. As an example, information input by users on the client computer systems 108a-c can be transmitted to the engine 150 through the transmission module 204. This information can then be processed (e.g., using the processing module 206) and/or stored (e.g., using the database module 202). As another example, information from the computer systems 104a and 104b (e.g., data indicating the performance metrics of the computer systems 104a and 104b) can be transmitted to the engine 150 through the transmission module 204. This information can then be processed (e.g., using the processing module 206) and/or stored (e.g., using the database module 202). As another example, information from the engine 150 (e.g., information stored on the database module 202) can be transmitted to one or more of the computer systems 104a and 104b and/or the client computer systems 108a-c through transmission module 204.

The processing module 206 processes data stored or otherwise accessible to the engine 150. For instance, the processing module 206 can execute automated or user-initiated processes that interrogate data for anomalies. As an example, the processing module 206 can interrogate data stored on the database module 202, or data that is received from the transmission module 204. Likewise, processed data from the processing module 206 can be stored on the database module 202 and/or sent to the transmission module 204 for transmission to other devices. In some cases, the processing module 206 can identify potentially anomalous conditions in connection with the operation of the computer systems 104a and 104b. Example processes that can be performed by the processing module 206 are described in greater detail below.

One of more implementations of the compact data structure generation engine 150 can be used to generate compact data structures including data summaries of the performance of a computer system over a period of time, and identify potentially anomalous conditions during the operation of the computer system. The generation of the compact data structures and the detection of the anomalous conditions may be agnostic to the type of data being interrogated and/or to the operation from which the data was derived. For instance, anomalies in a dataset may be detected by engine 150 without advance notice of or information related to whether the data in the dataset pertains to performance data regarding requests sent to or received by computer systems 104a, 104b, operations performed by or on the computer systems 104a, 104b, or data storage on computer systems 104a, 104, among other types of performance data. The compact data structure generation engine 150 need not have data characterizing the performance data prior to generation of the compact data structures. In some implementations, the compact data structure generation engine 150 can generate the compact data structure(s) summarizing the performance data independent of identifying a minimum and/or maximum value of the performance data, a number of items of the performance data, a type of distribution of the performance data, and so forth. For example, the compact data structure generation engine 150 generates the compact data structure that summarizes the performance data and maintains the values of the statistical metrics of the performance data as values of the performance data are received without performing any analysis (such as finding a maximum or minimum value) on the entire data set.

Figure 3:
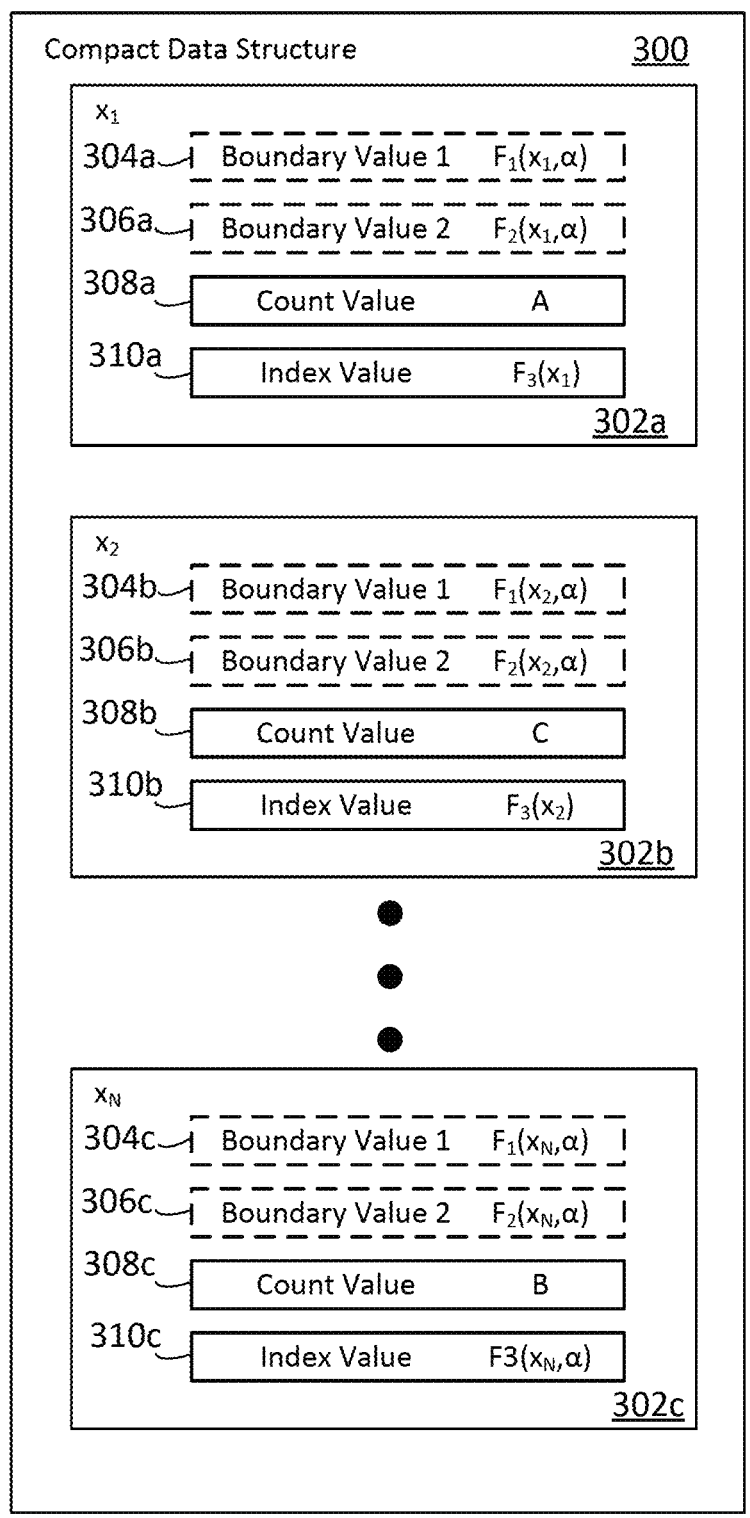
FIG. 3 is an example of a compact data structure.

FIG. 3 shows an example compact data structure 300 that can be generated by the compact data structure generation engine 150 of FIG. 2. The compact data structure 300 includes a summary of performance data that preserves values of the statistical metrics of the performance data. By preserving the values of the statistical metrics of the performance data, the compact data structure 300 enables statistical data about the performance data to be retrieved from the compact data structure without storing the performance data itself.

For example, a query for a value of the performance data at a particular percentile can be satisfied by the server system 102 using the data stored in the compact data structure 300 representing the performance data. Because the compact data structure 300 is configured to summarize the performance data within a relative error, a request for the statistical metric or value of a percentile returns an approximated value that is accurate within the percentage threshold specified. For example, if the $99^{th}$ percentile value (or sub-percentile) is requested, the approximated value returned is within the threshold error permitted of the actual value it represents. Some error in the actual percentile value (rank error) of the returned approximated value is permitted (e.g., the returned value might actually be closer to the $98^{th}$ percentile). As an example, if the actual value is 2.23 seconds, and the specified relative error is 0.01, the approximated value is between (inclusive) 2.2077 seconds and 2.2523 seconds. The server system 102 can thus receive a query for a value of a statistical metric of the performance data and quickly respond with an approximation of the value that is within a known relative error with respect to the actual value of the statistical metric of the performance data.

The compact data structure 300 shown in FIG. 3 includes ranges 302a, 302b, and 302c (generically referred to as a range 302). The ranges 302 are related to one another in the compact data structure 300 as representing the performance data. The ranges 302 (also referred to as buckets) each represent one or more values of the performance data that are between a first boundary that defines one endpoint of a range and a second boundary that defines another endpoint of the range. Each range 302a, 302b, and 302c is associated with a respective first boundary value 304a, 304b, 304c (generically referred to as the first boundary value 304) and a second boundary value 306a, 306b, 306c (generically referred to as the second boundary value 306). In some implementations, the boundary values 304a-c, 306a-c for each range 302a-c are implied by the index values 310a-c, respectively. The boundary values 304, 306 can be calculated from the index value and need not be explicitly stored. The compact data structure 300 includes, for each entry 302a-c, a count value 308a-c and an index value 310a-c. In some implementations, the boundary values are determined when an entry is generated, and the boundary values are stored in the compact data structure 300. The implied boundary values 304, 306 are represented in FIG. 3 as having dashed lines to indicate that they need not be explicitly stored in the compact data structure 300.

The boundary values 304, 306 for a range 302 designate what values of the performance data are assigned to that range. The boundary values 304, 306 are dynamically determined based on the value of the performance data. The first boundary value 304 is a first function of the value of the performance data. As shown in FIG. 3, the first boundary values 304a, 304b, and 304c are each defined by the function $F_1(x,\alpha)$, where x is the value of the performance data being summarized in the compact data structure 300 and where a is the relative error value specified for the compact data structure. For example, first boundary value 304a is defined by $F_1(x_1,\alpha)$, first boundary value 304b is defined by $F_1(x_2,\alpha)$, and first boundary value 304c is defined by $F_1(x_N,\alpha)$, where N is the number of the range being defined.

Similarly, second boundary values 306a, 306b, and 306c are each defined by the function $F_2(x,\alpha)$, where $F_1(x,\alpha)$ is different from $F_2(x,\alpha)$. For example, second boundary value 306a is defined by $F_2(x_1,\alpha)$, second boundary value 306b is defined by $F_2(x_2,\alpha)$, and second boundary value 306c is defined by $F_2(x_N,\alpha)$. In some implementations, $F_1(x,\alpha)$ is defined as $\gamma^{(i-1)}$, where $\gamma=1+2\alpha$ and $i=\log_\gamma(x)$. In some implementations, $F_2(x,\alpha)$ is defined as $\gamma^{(i)}$, where $\gamma=1+2\alpha$ and $i=\log_\gamma(x)$. In some implementations, value of i is subjected to a ceiling operation to round to the nearest integer when defining the first and second boundary values 304,

306. The dynamic definition of the boundary values 304, 306 enables the compact data structure to approximate each value of the performance data within a relative error specified by a to provide the advantages described above. As described above, the boundary values need not be explicitly stored in the compact data structure 300.

Each of the ranges 302*a*, 302*b*, and 302*c* is also associated with a respective count 308*a*, 308*b*, 308*c* (generically referred to as count 308). The counts 308*a-c* each represent a number of values of the performance data that are associated with the respective ranges 302*a-c*. Once a range 302 is defined, subsequent values of the performance data that fall within the first and second boundary values 304, 306 of that range are assigned to that range. For example, if a value of the performance data is within the range defined by boundary values 304*a* and 306*a*, the value is assigned to range 302*a* and the count value 308*a* is incremented by one. Similarly, if a value of the performance data is within the range defined by boundary values 304*b* and 306*b*, the value is assigned to range 302*b* and the count value 308*b* is incremented by one. The value x of the performance data itself is not stored; the count 308 represents the values that are assigned to the range 302. In FIG. 3, the values of the counts 308*a-c* are A, B, and C, respectively, but in practice the counts include integer values.

The counts 308*a-c* for each range 302*a-c* represent the distribution of the performance data values. To respond to a percentile query (or other quantile query) the server system 102 sums the count values 308*a-c* of respective ranges 302*a-c* until the range including the requested quantile is found. This can be done because the total number of values of the performance data represented in the compact data structure is known. The precision of the quantile request is based on the size of the ranges; when more ranges are defined, the rank error is reduced. However, as stated above, every value of the performance data represented in a range 302 is within the relative error of the boundaries 304, 306.

Each range 302*a-c* is associated with an index value 310*a-c*, respectively. The index value is a function $F_3(x,\alpha)$. In some implementations, the function $F_3(x,\alpha)$ includes $\log_\gamma(x)$, where $\gamma=1+2\alpha$. In some implementations, the index values 310*a-c* are subjected to a ceiling operation so that the index values are integer values.

In some implementations, when the performance data is growing (or shrinking) at an exponential rate the compact data structure 300, a number of ranges 302 of the compact data structure 300 can be equal to a number of values of the performance data. This can also occur when the distribution of the performance data has tails fatter than that of a double-exponential distribution. In some implementations, the number of ranges N can be capped at a maximum number M to ensure that the compact data structure introduces memory savings of a minimum amount (e.g., a minimum ratio). In some implementations, the maximum number M of ranges is used by the engine 150 to ensure that the compact data structure 300 occupies less than a particular amount of storage. When additional ranges of a number that would exceed the threshold M are required, the ranges 302 having the smallest index values 310*a-c* are merged together, and their counts are summed together.

Figure 5:
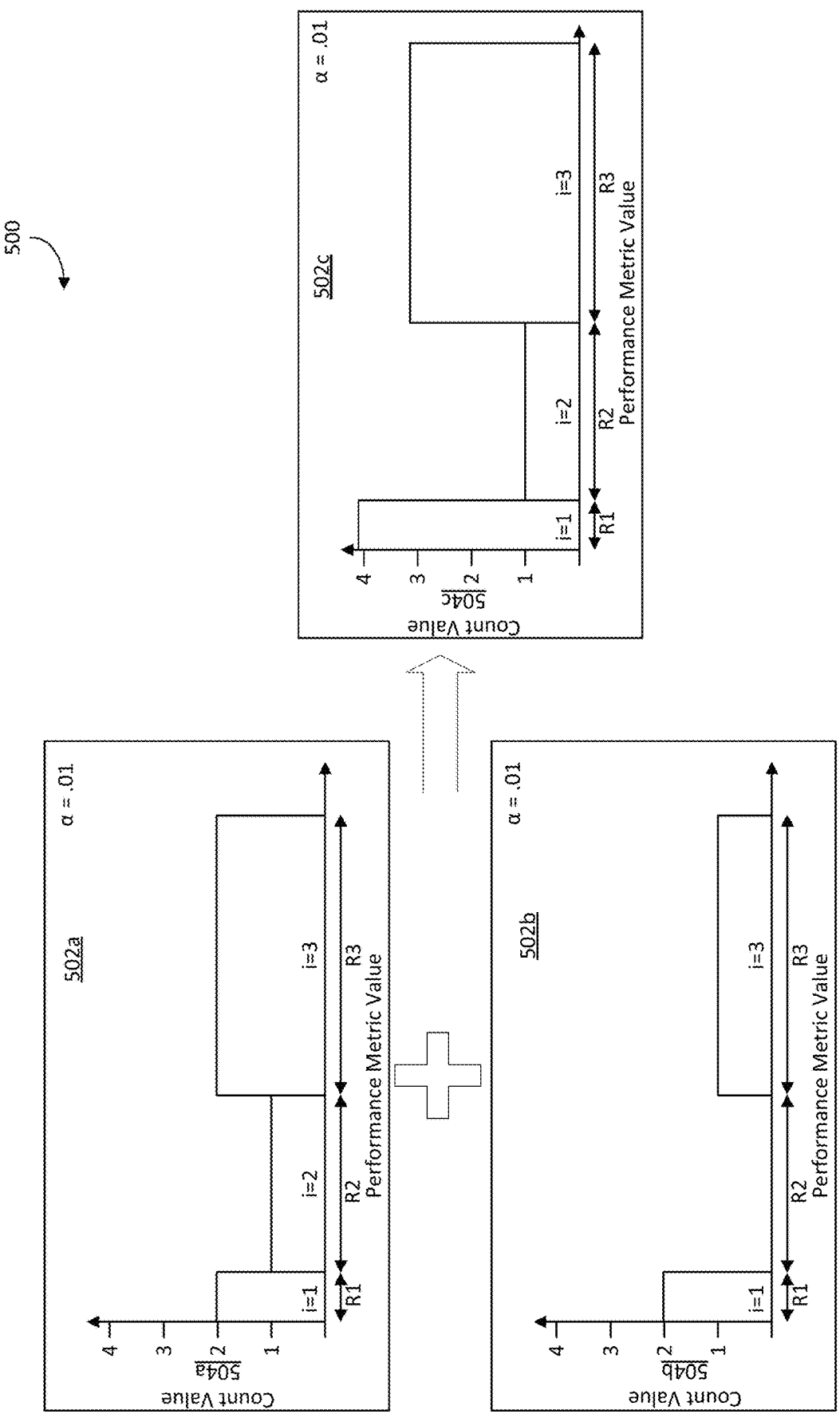
FIG. 5 is an example of a merge operation of the compact data structure of FIG. 3.

As described further in relation to FIG. 5, compact data structure 300 can be merged with other instances of the compact data structure, as long as the value of a is identical for each compact data structure being merged. The server system 102 can function as an aggregator of compact data structures generated at the computing systems 104*a*, 104*b*. For example, each computing system 104*a*, 104*b* can generate its own compact data structure 300 for performance data local to the respective computing system. To obtain a representation of all performance data in the system 100, the computing systems 104*a*, 104 send their generated compact data structures to the server system 102. The server system 102 in turn is configured to generate its own compact data structure 300 for performance data related to itself (e.g., requests for data by the computing systems 104*a*, 104*b*).

The compact data structures generated by each computing system 104*a*, 104*b* can be merged into a single compact data structure at server system 102. The server system 102 adds the count values of the ranges having matching index values 310*a-c* together. For example, the count value 308*a* for index value 310*a* for a first compact data structure of computing system 104*a* is added to another count value 308*a* for the index value 310*a* of a second compact data structure of computing system 104*b*.

Figure 4:
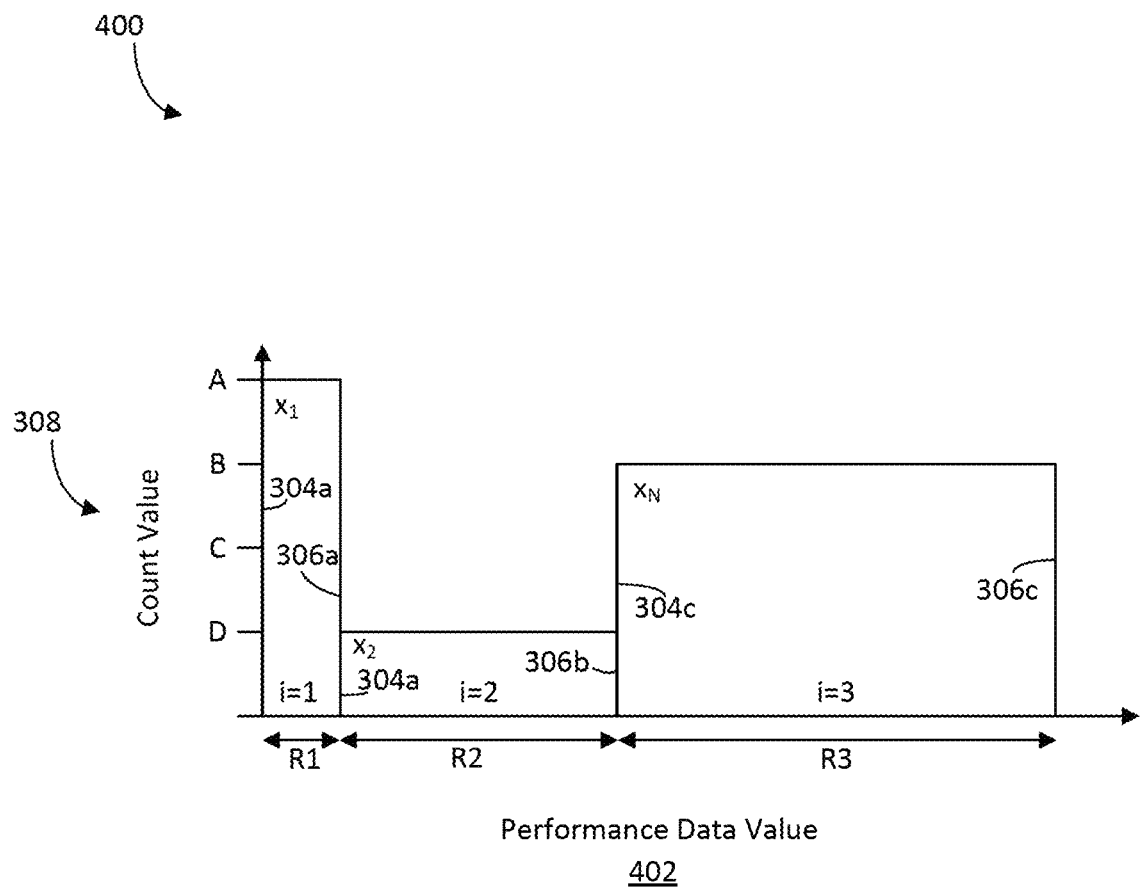
FIG. 4 is an example of a distribution represented by a compact data structure of FIG. 3.

FIG. 4 shows an example distribution 400 that can be represented by compact data structure 300 of FIG. 3. The count values 308*a-c* are shown on a first axis and the performance data values 402 are shown on a second axis. R1 refers to the range 302*a* defined by 304*a*, 306*a*. Similarly, R2 refers to the range 302*b* defined by 304*b*, 306*b*. Likewise, R3 refers to the range 302*c* defined by 304*c*, 306*c*. In this example, the value of index value 310*a* is 1, the value of index value 310*b* is 2 and the value of index value 310*c* is 3.

FIG. 5 shows an example of a merge 500 operation. In this example, two compact data structures 502*a* and 502*b* are merged into a single compact data structure 502*c*. As described above, the count values 504*a* and 504*b* for ranges R1, R2, and R3 are added together, respectively. The size of R1, R2, and R3 are identical for compact data structures 502*a* and 502*b* because the values of a are identical for each compact data structure (in this example, $\alpha=0.01$). Compact data structure 502*a* has a count value 504*a* of 2 for R1, 1 for R2, and 2 for R3. Compact data structure 502*b* has a count value 504*b* of 2 for R1, 0 for R2 (e.g., R2 is not yet defined for compact data structure 502*b*), and 1 for R3. When the compact data structures 502*a* and 502*b* are merged, the resulting compact data structure 502*c* has updated values for each of ranges R1, R2, and R3. The count value 504*c* of R1 is the sum of R1 for compact data structure 502*a* and 502*b*. Here, 2+2=4. Similarly, the count value 504*c* for R2 is 1+0=1. Likewise, the count value 504*c* of R3 is 1+2=3. As such, the statistical metrics of the performance data are preserved for the entire set of performance data in compact data structure 502*c*.

The server system 102*a* can analyze the compact data structures 502*a*, 502*b*, or 502*c* to determine if any anomalies exist in the system 100. In some cases, in response to identifying an anomaly, the engine 150 can generate a notification to a user alerting him to the anomaly. This can be beneficial, for example, as it enables the user to perform one or more corrective action more quickly. Notifications can include, for example, e-mail messages, chart messages, text messages (e.g., Short Message Service messages), telephone messages, voicemail messages, fax messages, or other forms to communication used to convey auditory and/or visual information. In some cases, the engine 150 can transmit a notification to one or more of the client computer systems 108*a-c* (e.g., using the transmission module 204), such that a user of the client computer systems 108*a-c* can retrieve and review the notification (e.g., using the user interfaces 110*a-c*).

Figure 6:
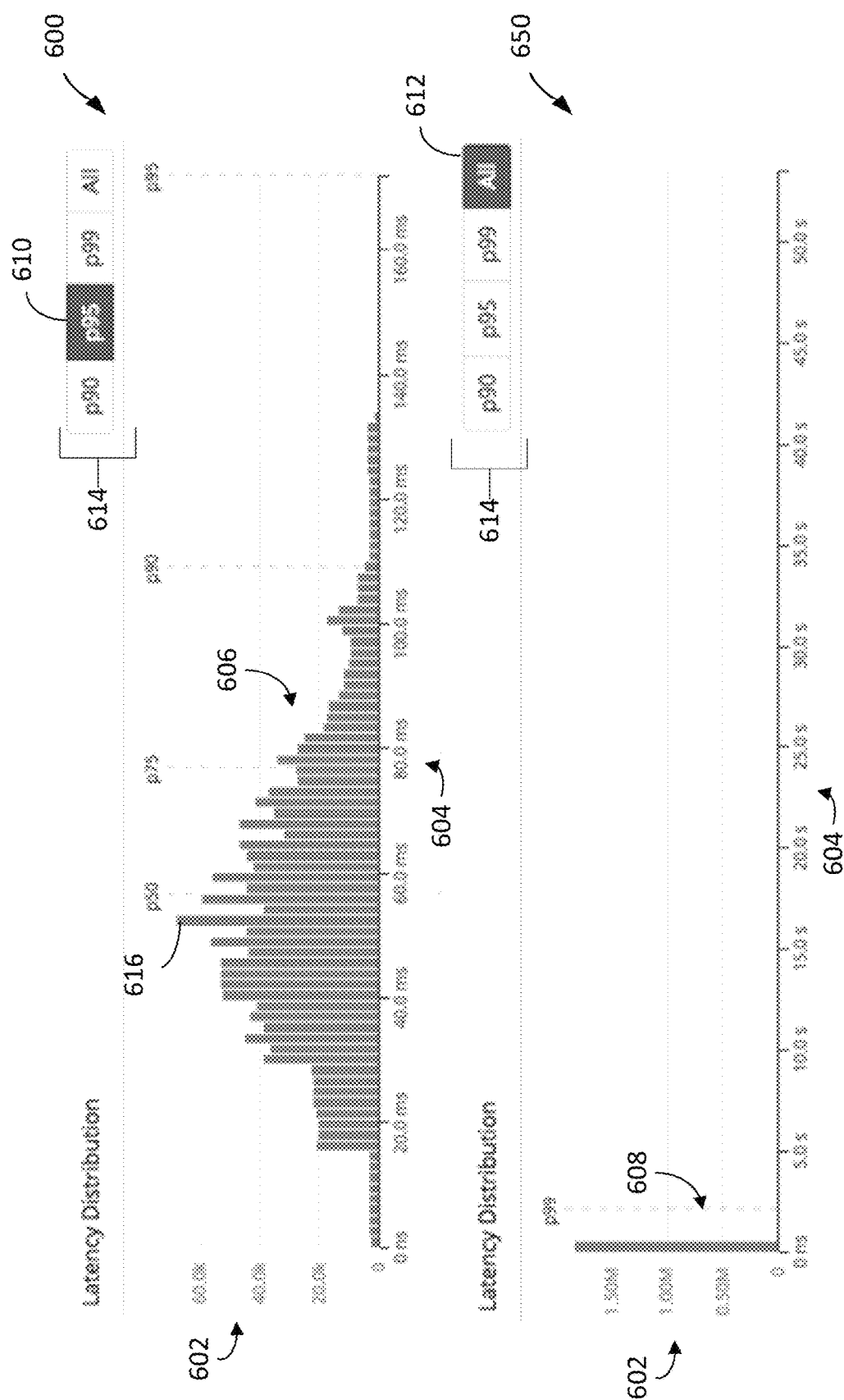
FIG. 6 is an example of a user interface.

In some implementations, the engine 150 can generate a representation of a distribution of the performance data, such as for presentation to a user. Turning to FIG. 6, example user interfaces 600, 650 are shown. The user interface 600 shows a visualization of a compact data structure (e.g., compact data structure 300 of FIG. 3) as distribution 606. The distribution 606 includes ranges, such as range 616. Each range is associated with a value 604 of the performance data values that is includes and a count 602 representing the number of performance data values represented by the range. For example, range 616 represents over 60,000 values of the performance data and represents a range of about 2 ms for response times of a computing system, or about 52-54 ms. This means, for this example, that for over 60,000 requests for data from the computing system(s) represented by the distribution 606, the response time by the computing system(s) was between about 52-54 ms. Rage 616 is also close to the mean (p50 or $50^{th}$ percentile) value of response times for this distribution 606.

In some implementations, one or more controls 614 can enable selection of particular portions of the distribution 606 for review in the user interface 600. In this example, the distribution 606 includes ranges from the 0 to the $95^{th}$ percentiles, as shown by selection of control 610. The one or more controls 614 can include buttons, sliders, or any such interactive mechanism for selecting and manipulating the visualization of the distribution 606. In some implementations, a particular range, such as range 616, can be selected to show its boundary values, count, index, and so forth.

User interface 650 is similar to user interface 600, except that a different percentile value is selected on the one or more controls 614. In this example, the entire distribution 608 is shown (from 0-100th percentiles) as the "all" control 612 is selected. However, because several response times are orders of magnitude larger than the response times shown in user interface 600 (e.g., on the order of seconds rather than milliseconds), the distribution 608 appears compressed, and a few outliers in the ranges of 5-20 seconds are barely visible. A few outliers in the 5-20 seconds range can be handled by dynamically setting boundary values for the ranges as described above. The compact data structure 300 is able assign the outlier values to ranges without creating hundreds, thousands, tens of thousands, etc. of interpolated ranges that represent counts of zero (e.g., no performance data). In this example, the compact data structure 300 does not assign all the outliers, which may have very different values of several seconds, to a single percentile range of the $99^{th}$ percentile. As described above, preserving rank error in this situation would correctly assign the outlier values (e.g., values greater than about 2 seconds) to the $99^{th}$ percentile but the relative error would be high. The difference between an annoying response time of several seconds would be conflated with a failed response time, or a response time causing the client system to drop the request (e.g., 20 seconds or more). The compact data structure 300, configured to keep relative error within the percentage specified, is able to distinguish between these outlier values and still reduce the size of the performance data as described above. While a vast majority of the values of the performance data are assigned to ranges shown in distribution 606, the outlier ranges shown in distribution 608 (barely visible because of low counts relative to the ranges of distribution 606) preserve the details of outlier values of the performance data.

In some implementations, the engine 150 can generate alerts when ranges of distribution 608 indicate high counts of response times for values greater than a threshold value. For example, if the ranges greater than 10 seconds exceed 500 response times, an alert can be generated identifying the computing system(s) responsible so that corrective action can be taken (e.g., routing the requests to a different computing system).

In some cases, a user can customize the manner in the engine 150 generates compact data structures 300 for use in monitoring the high-scale network. For instance, a user can specify that the engine 150 periodically generate a compact data structure 300 every set amount of time and transmit the generated compact data structure to a system-wide aggregator. Once the compact data structure 300 is generated, any function can be Further, the user can specify the manner in which the engine 150 identifies anomalies (e.g., by specifying one or more particular techniques for determining forecast ranges for the performance metrics based on historical data). Further, the user can specify that the engine 150 transmit notifications in a particular manner upon identifying an anomaly. In this manner, a user can closely control each aspect of the anomaly detection process to suit his specific needs.

Figure 7A:
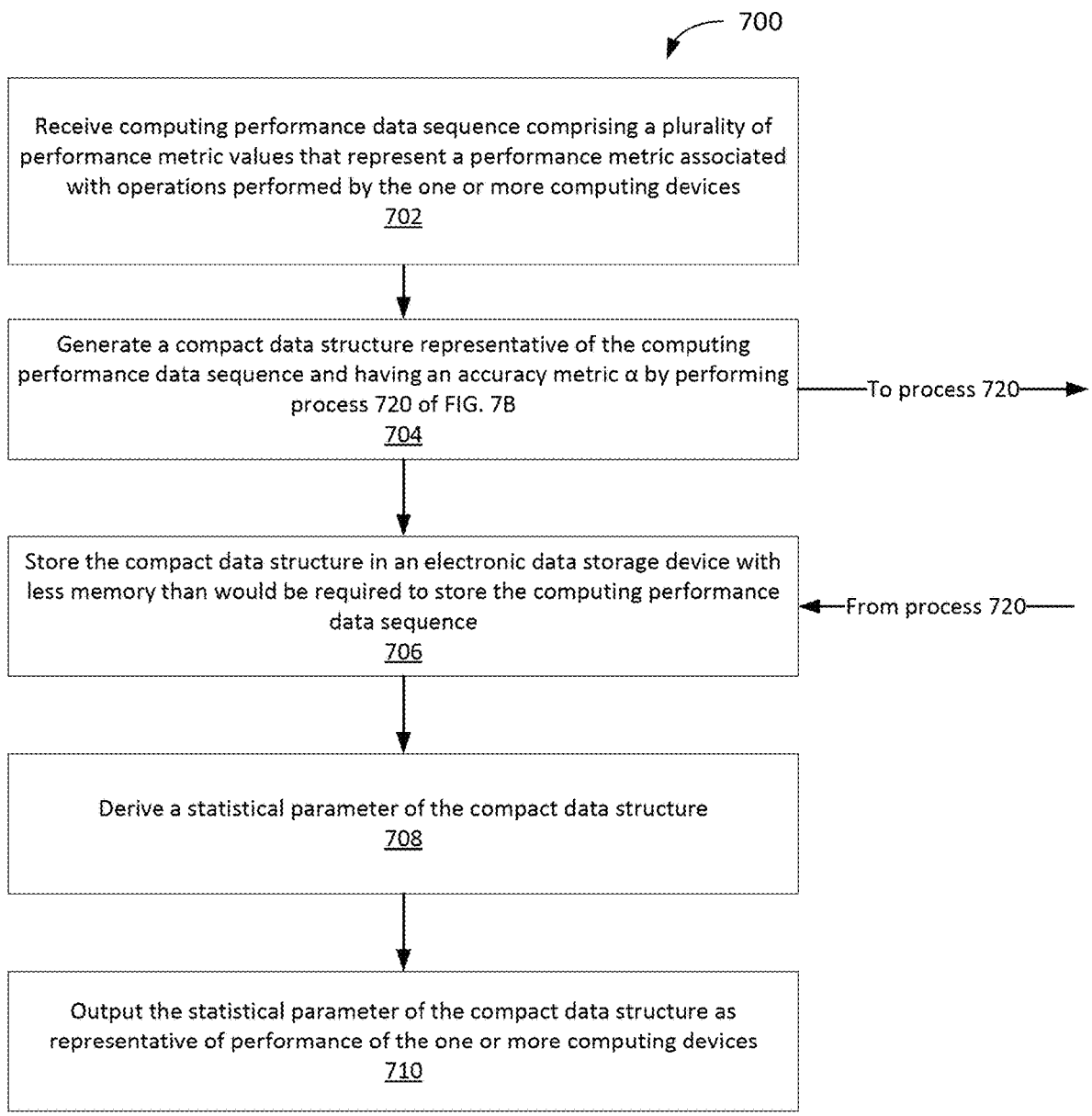
FIGS. 7A-7B are example flow diagrams of operations performed by the data processing system for generating the compact data structure of FIG. 3.

FIGS. 7A-7E are example flow diagrams of operations performed by the data processing system. FIG. 7A shows example process 700 for generation of a compact data structure, e.g., compact data structure 300 generated by compact data structure generation engine 150 of server system 102. Is some aspects, the engine 150 receives (702) a computing performance data sequence comprising a plurality of performance metric values that represent a performance metric associated with operations performed by the one or more computing devices. As described above, the computing performance data sequence can include response times of the server system 102 or other computing systems (e.g., computing system 104a, 104b). However, it is not required that the data be performance metric data. Any data sequence having statistical properties can be summarized by the engine 150.

In some implementations, the engine 150 is configured to generate (704) a compact data structure representative of the computing performance data sequence and having an accuracy parameter α, such as by performing process 720 described in relation to FIG. 7B, below. As described above, the compact data structure maintains the statistical information about the performance data that is being summarized in the compact data structure while reducing the amount of data representing the performance data. The compact data structure is more manageable than the performance data for analysis (e.g., statistical analysis), copying, storing, transmitting, etc.

In some aspects, the engine 150 is configured to store (706) the compact data structure in an electronic data storage device with less memory than would be required to store the computing performance data sequence. The reduction in size can be any almost any ratio but generally is approximately a ratio of at least n:log(n), where n is the number of values of the performance data, and log(n) represents the number of ranges of the compact data structure. The reduction in size while maintaining α-accurate quantiles is a result of dynamically defining boundary values of the ranges, as described at least in relation to FIGS. 3 and 7B.

In some implementations, the engine 150 (or another portion of the server system 102) is configured to derive (708) a statistical metric of the compact data structure. As described above, the statistical metric can include a mean, median, mode, a quantile value, a standard deviation, etc. of the performance data.

In some implementations, the engine 150 (or another portion of the server system 102) is configured to output (710) the statistical metric of the compact data structure as representative of performance of the one or more computing devices.

Figure 7B:
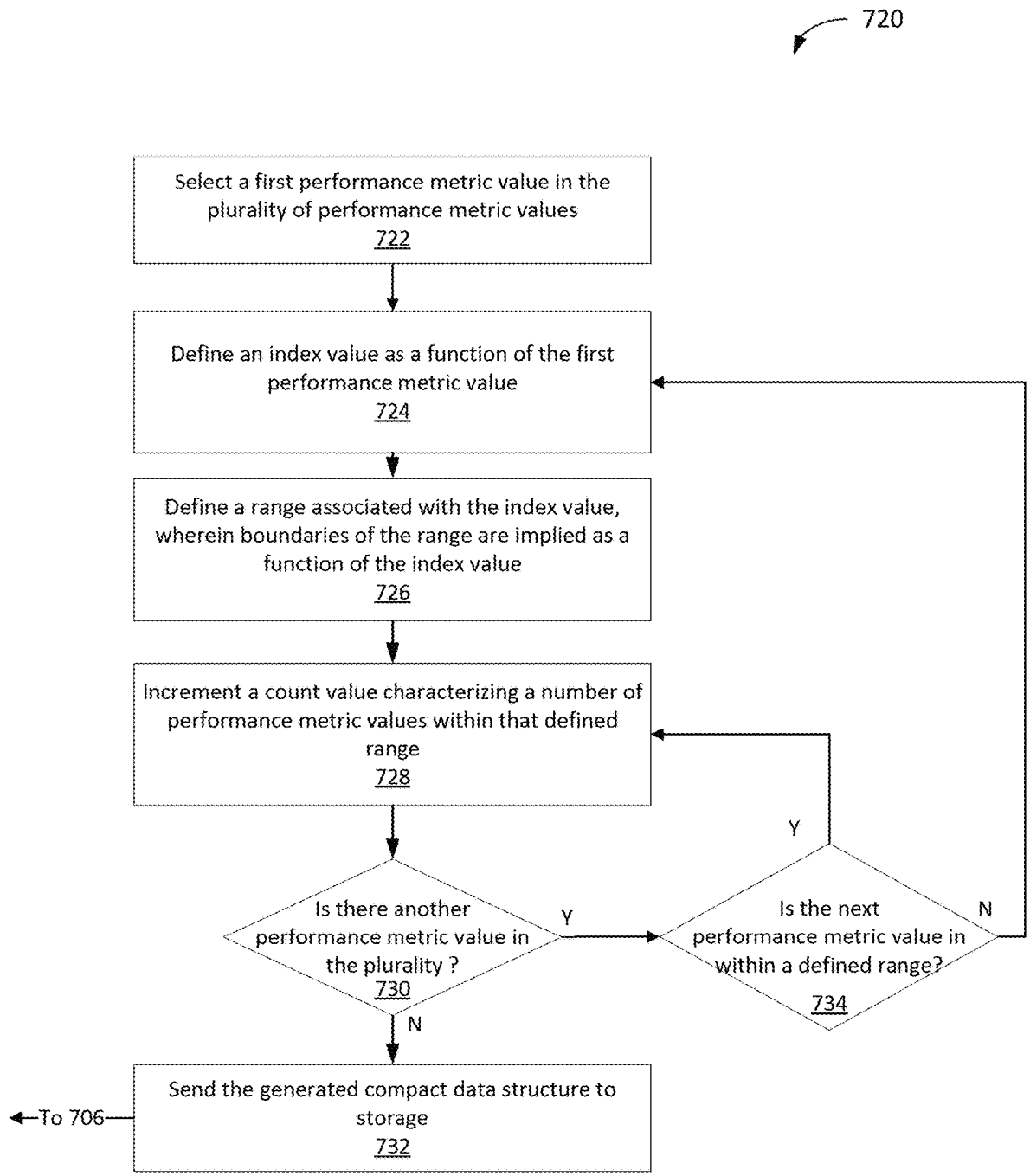

FIG. 7B shows example process 720 for generation of a compact data structure, e.g., compact data structure 300 generated by compact data structure generation engine 150 of server system 102, and that is in conjunction with process 700.

In some implementations, the engine 150 is configured to select (722) a first performance metric value in the plurality of performance metric values. For the first performance metric value (which can be any value of the plurality of performance metric values), the engine 150 is configured to define (724) an index value. The index value is determined as a function of the first performance metric value. In some implementations, the index value is defined as $\log_\gamma(x)$ where x is the corresponding performance metric value, and $\gamma=1+2\alpha$. In some implementations, the index value is rounded to an integer value.

The engine is configured to define (726) a range for association with the index value. The boundaries of the range (e.g., first and second boundary values) are set as a function of the index value, but need not be explicitly stored in the compact data structure. In this way, the boundary values of each range of the compact data structure are dynamically defined. Each performance metric data value assigned to a range is guaranteed to have a relative error of less than a, where a is a percentage error tolerance for the compact data structure. In some implementations, the first and second boundary values are respectively defined according to the functions $\gamma^{\log_\gamma(x)-1} < x \leq \gamma^{\log_\gamma(x)}$, where x is the corresponding performance metric value, and $\gamma=1+2\alpha$. In some implementations, each a ceiling function is applied to the logarithms of the boundary value functions to round up the logarithm values to the nearest integer values.

In an aspect, the engine 150 is configured to increment (728) a count value characterizing a number of performance metric values within that defined range. For example, if the performance metric value is the first added to the range, the count value is one. For the second performance metric value added, the count is incremented to two, and so forth.

Once the count value is incremented, the engine 150 determines (730) whether there exists any more performance metric values in the sequence that have not been assigned to a range. If no more values exist, the generation of the compact data structure is completed and the compact data structure is sent (732) to storage or some other system for one or more applications. If more values exist in the performance data, the engine 150 selects another value and determines (734) whether the next value is within a defined range. If the value is within a defined range, the count of that range is incremented (728) as described above. If the value does not fit within a defined range, a new range is defined (724) such as described above.

Figure 7C:
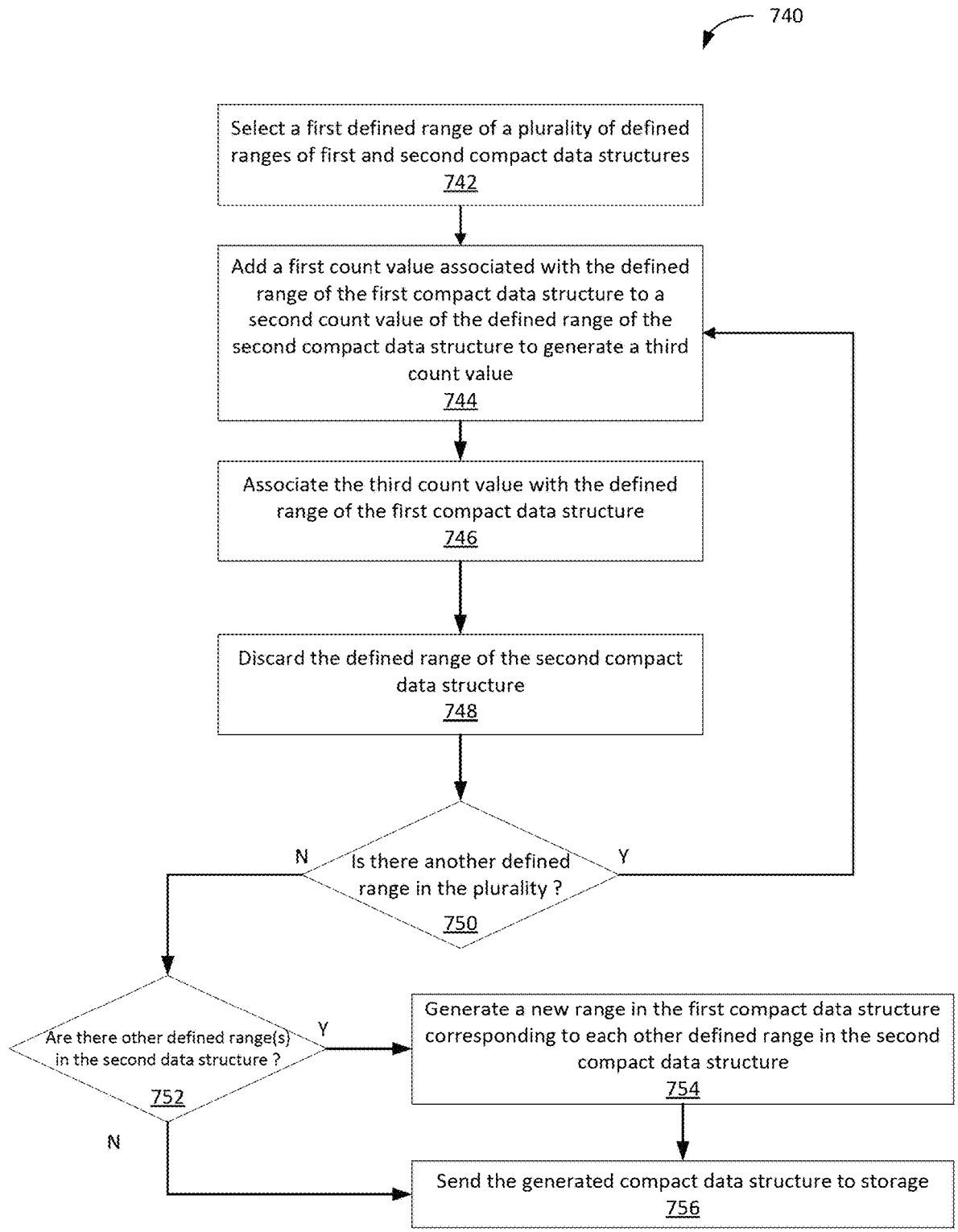
FIG. 7C is an example flow diagram of operations for merging two compact data structures.

FIG. 7C shows example process 740 for merging two compact data structures, such as compact data structure 300 generated by compact data structure generation engine 150 of server system 102.

In some implementations, the engine 150 selects (742) a first defined range of a plurality of defined ranges of first and second compact data structures. For example, the engine 150 may start with the ranges having the smallest index numbers. However, the engine can select any ranges. The ranges selected for the first and second compact data structures each have an identical index value, which occurs when each compact data structure has the same relative error tolerance value a, as the ranges will have the same boundary values (e.g., the same sizes) for the same values.

Once a particular range is selected for the first and second compact data structures, the engine 150 is configured to add (744) a first count value associated with the defined range of the first compact data structure to a second count value of the defined range of the second compact data structure to generate a third count value that is the total of the first and second count values.

Once the third count value is determined, the engine 150 associates (746) the third count value with the defined range of one of the compact data structures (e.g., the first compact data structure). This association is made by changing the count value of the selected compact data structure that is associated with the index that was selected for both compact data structures to be the third count value. The third count value represents a merged range for that index. Once the range is merged, the extra range (e.g., the range of the second compact data structure) can be discarded (748), as its representation in the engine 150 is now redundant. If the engine 150 determines (750) that there is another index value representing ranges to be merged, the process repeats for that new index value.

The engine 150 checks to determine (752) whether any ranges remain in the second compact data structure that have not been merged into the first compact data structure. For example, the first compact data structure may not have defined a corresponding range to each range in the second compact data structure. The remaining ranges are added to the first compact data structure by generating (754) a new corresponding range in the first compact data structure for each remaining range in the second compact data structure.

Once the compact data structures are merged, the merged compact data structure can be sent (756) to storage (or some other system) for one or more applications. As described above in relation to FIG. 5, the server system 102 can act as an aggregator for compact data structure generated for each computing system 104a, 104b.

Figure 7D:
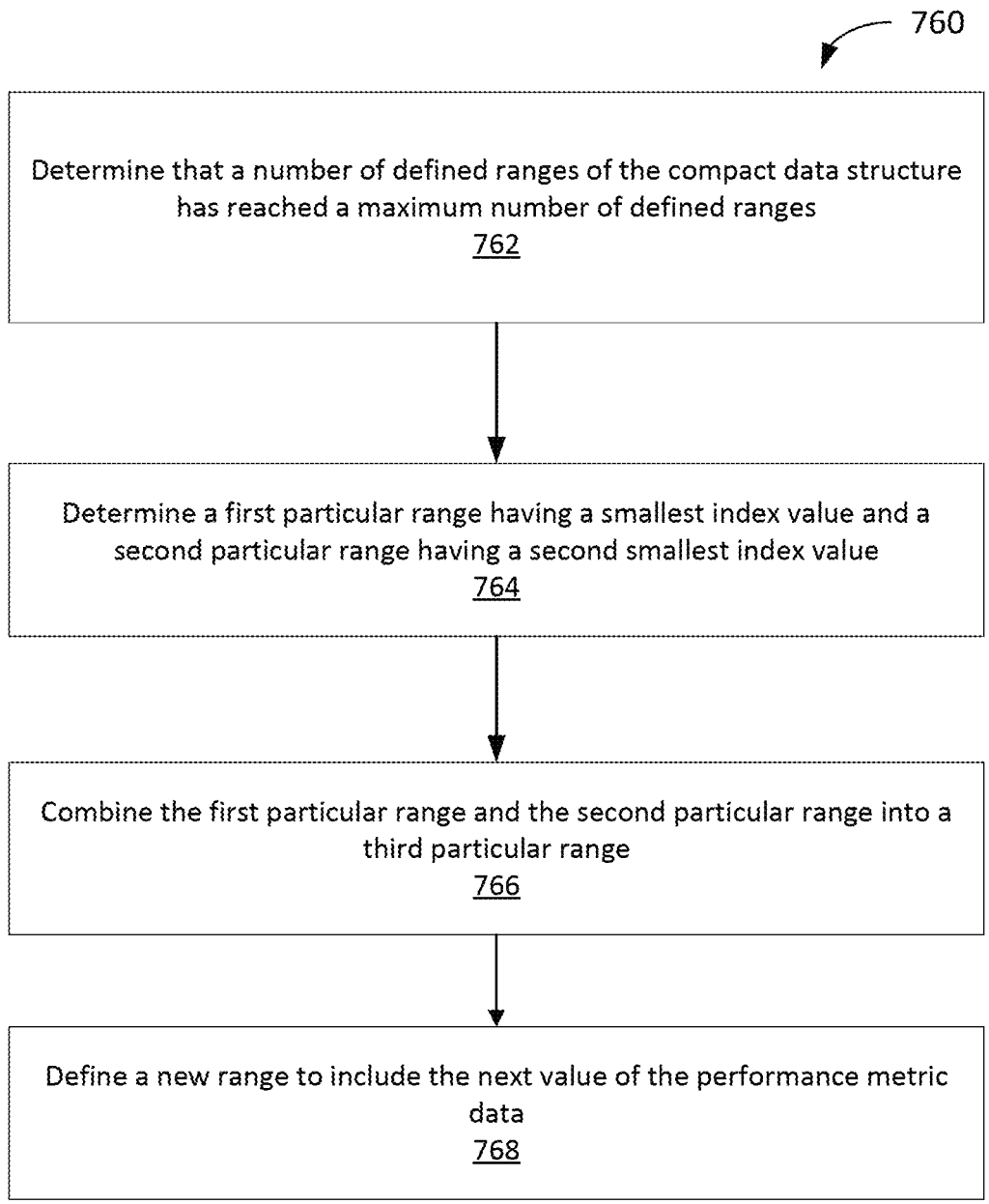
FIG. 7D is an example flow diagram of operations for merging two ranges.

FIG. 7D shows example process 700 for capping a number of ranges of the compact data structure, e.g., compact data structure 300 generated by compact data structure generation engine 150 of server system 102.

In some implementations, the engine 150 determines (762) that a number of defined ranges of the compact data structure has reached a maximum number of defined ranges. In some implementations, the maximum number is predefined by a system operator to limit the size of the compact data structure. The compact data structure does not need to have the exact number of ranges equal to the maximum number, but rather defines ranges as required by the distribution of the performance metric data to maintain a quantile accuracy. However, if the distribution is such that the maximum number of ranges is to be exceeded, two or more ranges are merged. In some implementations, there is no maximum number of ranges and the process 760 is not executed, even if the number of ranges is equal to the number of performance metric data values.

In some implementations, the engine 150 is configured to determine (764) a first particular range having a smallest index value and a second particular range having a second smallest index value. Selecting the ranges with the smallest index values ensures that the smallest ranges are merged. The engine 150 is configured to combine (766) the first particular range and the second particular range into a third particular range. In some implementations, the engine 150 defines (768) a new range to include a next performance metric value that did not fit into any of the defined ranges of the compact data structure, which prompted a new range to be defined and exceed the maximum number of allowed ranges. As two ranges are merged and one is added, the total number of ranges is kept at the maximum number.

Figure 7E:
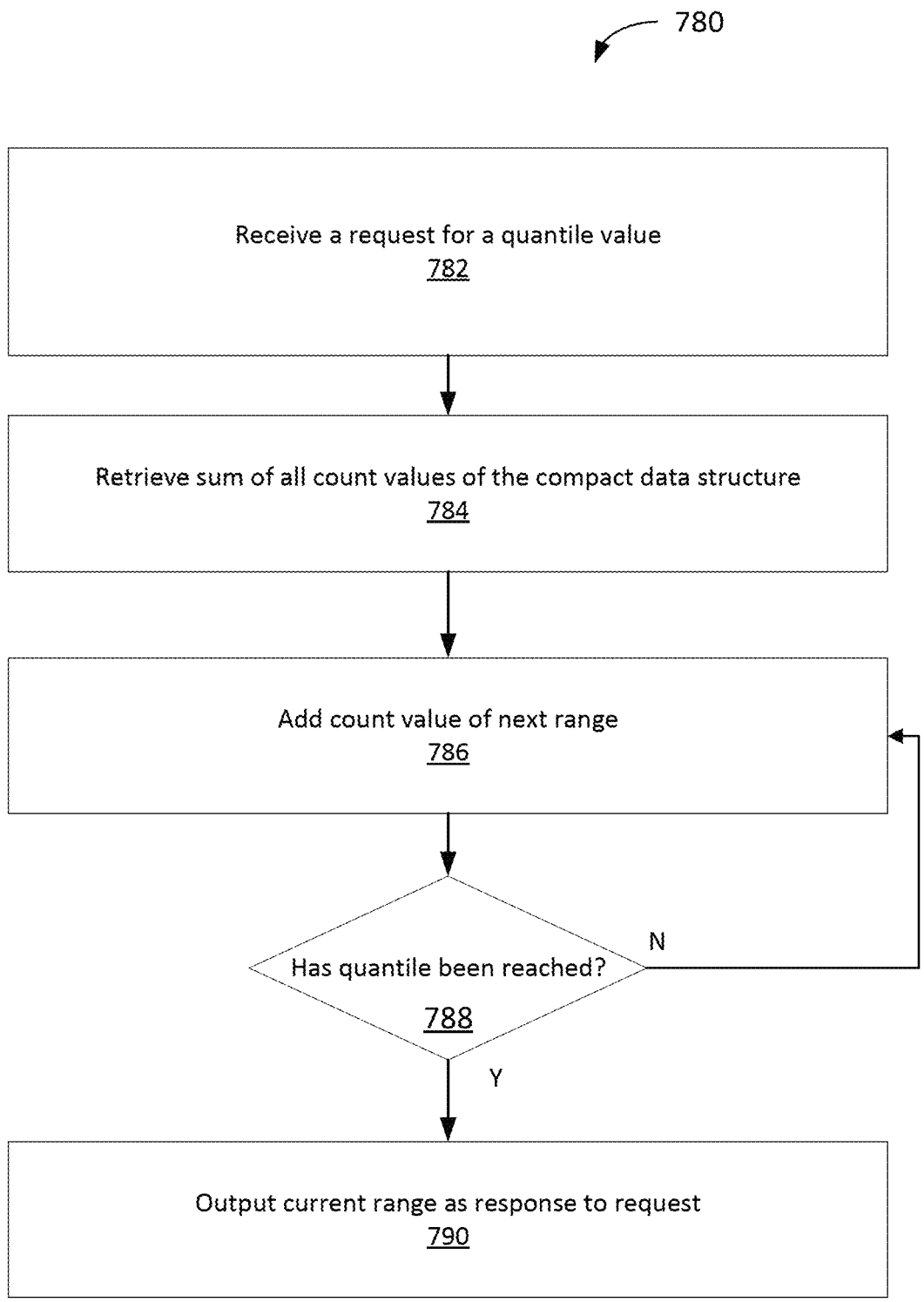
FIG. 7E is an example flow diagram of operations for responding to a quantile request.

FIG. 7E shows example process 780 for responding to a quantile request from a compact data structure, e.g., compact data structure 300 generated by compact data structure generation engine 150 of server system 102.

The engine 150 receives (782) a request for a quantile value. In one example, the request includes the quantile (e.g., 99.2 quantile). To find which range includes the performance metric value corresponding to the 99.2 quantile, the engine retrieves (784) a sum of all count values of the compact data structure. The sum of all count values is a value that represents the total number of performance metric values represented by the compact data structure. The total can be used as a denominator for finding the quantile value responsive to the request.

In some implementations, the engine 150 starts with the count value associated with the smallest index value. The engine 150 is configured to add (786) the next count value of the next highest index value until the quantile is reached. In some implementations, the engine 150 can work from the count value associated with the largest index value and work downward to smaller index values, subtracting from the 100th quantile. The engine 150 determines (788) whether the quantile has been reached by determining whether the count value to that point, when divided by the total of all count values retrieved from the compact data structure, has exceeded the quantile percentage requested. If the quantile requested is exceeded, the engine 150 can determine that the performance metric value responsive to the request is represented by the current range. The engine 150 outputs (790) the range (e.g., the index value, the boundary values, etc.) as responsive to the request.

Figure 8:
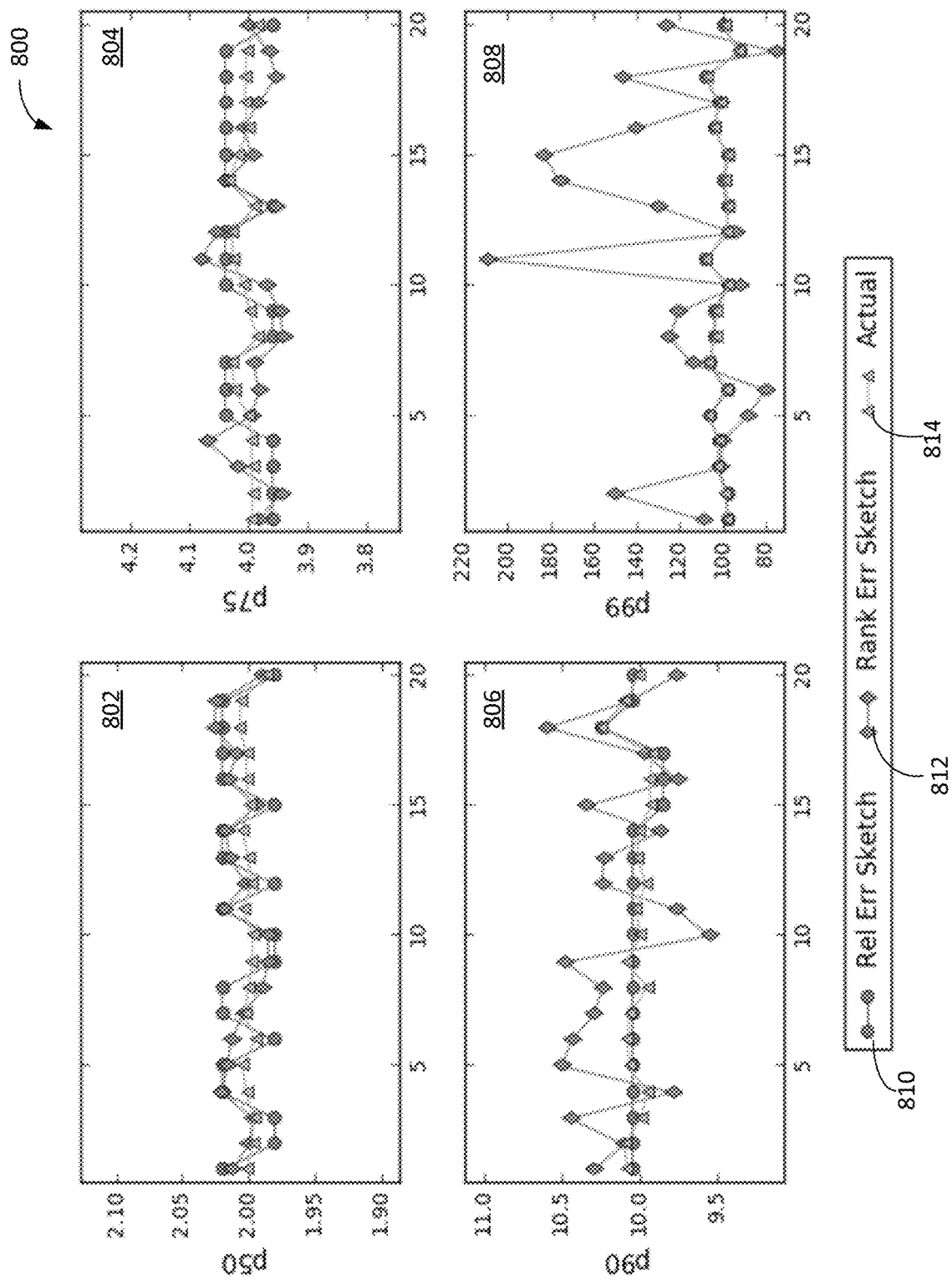
FIG. 8 is a series of graphs showing a comparison of output values for different data summarization techniques.

FIG. 8 is a series of graphs 802, 804, 806, and 808 (collectively graphs 800) showing a comparison of output values for different data summarization techniques. Each of the graphs 800 shows actual values of example performance data on the y-axis and an order of the values on the x-axis. Each of the graphs shows 20 batches of 100,000 performance data values. Graph 802 shows performance data values at the 50th percentile. Graph 804 shows performance data values at the 75th percentile. Graph 806 shows performance data values at the 90th percentile. Graph 808 shows values at the 99th percentile. Each of the graphs 800 shows results of a relative error compact data structure result 810, (e.g., compact data structure 300 described above), a rank error data summarization result 812, and the actual performance data values 814. The rank error result 812 was accurate to 0.005 rank error and the relative error compact data structure result 810 was accurate to 0.01 relative error. Graphs 802 and 804 show similar performance for both the relative result 810 and the rank result 812. However, graph 806 shows that the relative result 810 is improved over the rank result 812. Graph 808 shows a pronounced difference between the relative result 810 and the rank result 812 for the 99th percentile, in which the relative compact data structure outperforms the conventional rank error approach because the result 810 is much closer to the actual values 814 than the rank result 812.

Figure 9:
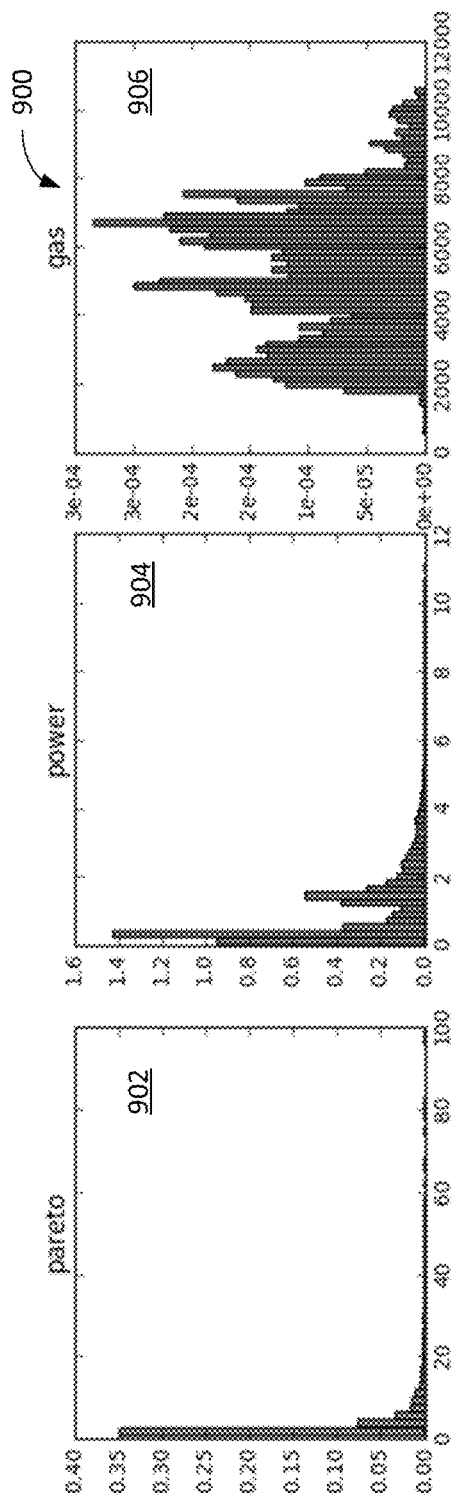
FIG. 9 is an example of data for testing the processes of generating compact data structures described herein.

FIG. 9 is an example of test data 900 for testing the processes of generating compact data structures described herein. Improvements over prior approaches for summarizing data are demonstrated using the test data 900 and described in relation to FIGS. 10-15, below.

The Pareto dataset 902 contains synthetic data generated from a Pareto distribution with a=b=1. The power dataset 904 is the global active power measurements from the UCI Individual Household Electric Power Consumption dataset (M. Lichman. 2013. UCI Machine Learning Repository. https://archive.ics.uci.edu/ml/datasets/individual+household). The gas dataset 906 consists of the last sensor value of the ethylene and CO mixture in the UCI Gas Sensor Array Under Dynamic Gas Mixtures dataset (M. Lichman. 2013. UCI Machine Learning Repository. https://archive.ics.uci.edu/ml/datasets/Gas+sensor+array+under+). All three datasets are real-valued and positive to allow a comparison with HDR Histograms.

The compact data structure 300 (labeled Compact D.S. in FIGS. 10-15) is compared against the GKArray (Michael B. Greenwald and Sanjeev Khanna. 2001. Space-efficient online computation of quantile summaries. In *Proc. 2001 ACM SIG-MOD International Conference on Management of Data (SIGMOD '01)*. ACM, New York, N.Y., USA, 58-66) and an HDR Histogram (Gil Tene. 2012. HdrHistogram: A High Dynamic Range (HDR) Histogram. http://hdrhistogram.org), two conventional data summarization approaches. GKArray guarantees that the rank error of the estimated quantiles will be smaller than $2\epsilon n$ (after merging). HDR Histogram is a relative-error sketch for non-negative integer values with a configurable range from lowest trackable value to highest trackable value. The accuracy is expressed as the number of significant digits d of the values. In order to use HDR Histogram for real-valued datasets, a scale factor a was set in the experiment so that for a value x, $\lfloor a \cdot x \rfloor$ is recorded. For the Pareto distribution, the lowest and highest trackable values are shifted to minimize the number of dropped values (that are outside the range) while maintaining the sketch size. Table 1 summarizes the values used for each distribution 902, 904, 906 of the test data 900.

TABLE 1

| Experiment Parameters | | | |
|---|---|---|---|
| | pareto | power | gas |
| DDSketch | $\alpha = 0.005$ | $\alpha = 0.015$ | $\alpha = 0.002$ |
| | $\min = 10^{-6}$ | $\min = 10^{-6}$ | $\min = 10^{-6}$ |
| | $m = 2048$ | $m = 2048$ | $m = 2048$ |
| GKArray | $\epsilon = 0.01$ | $\epsilon = 0.01$ | $\epsilon = 0.01$ |
| HDR Histogram | $\min = 10^5$ | $\min = 0$ | $\min = 0$ |
| | $\max = 10^{13}$ | $\max = 10^8$ | $\max = 10^8$ |
| | $d = 1$ | $d = 1$ | $d = 1$ |
| | $a = 10^6$ | $a = 10^6$ | $a = 10^3$ |

Figure 10:
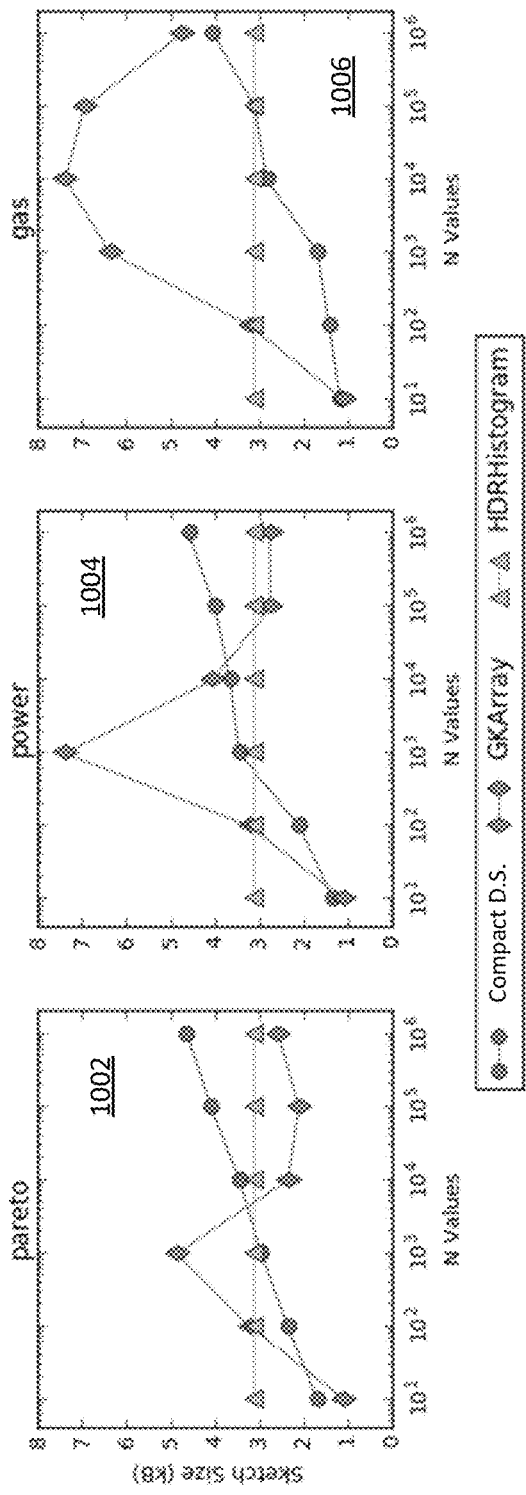
FIG. 10 is example data showing relative sizes of data structures when applied to the example data of FIG. 9.

Turning to FIG. 10, example data 1000 showing relative sizes of data structures when applied to the example data of FIG. 9. As shown in example results of graph 1002, for the Pareto data 902, the size of the compact data structure 300 is approximately the same as both the GKArray and the HDR histogram approaches. For this example Pareto data 902, each approach reduces the size of the example data to a few kilobytes (e.g., between 1-6 kB). Graphs 1004 and 1006 show similar results for the power data 904 and the gas data 906, respectively. However, as shown in FIGS. 11A-11D, the relative error of the GKArray and the HDR histogram approaches are consistently higher despite the data summaries being approximately the same size.

Figure 11A:
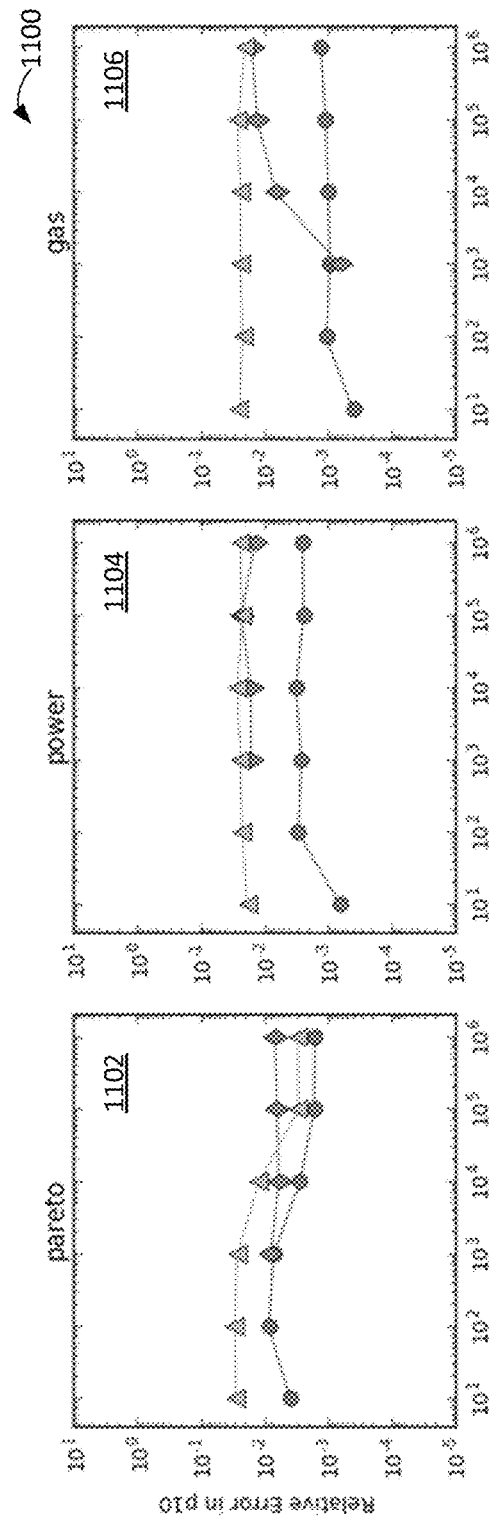
FIGS. 11A-11D show examples of relative error results for different data summarization techniques at various percentiles when applied to the example data of FIG. 9.

Turning to FIGS. 11A-11D, examples of relative error results for different data summarization techniques at various percentiles when applied to the example data of FIG. 9 are shown. In FIG. 11A, the example results 1100 include relative error values for the compact data structure 300, GKArray, and HDR histogram for the 10th percentile values of the test data 900. Graph 1102 shows example results for the Pareto data 902, graph 1104 shows example results for the power data 904, and graph 1106 shows example results for the gas data 906. For each of graphs 1102, 1104, and 1106, the compact data structure 300 produces a summarization of the test data 900 that is approximately an order of magnitude less erroneous than the GKArray or the HDR histogram. As stated above, the dynamic range boundary values that are determined during the generation of the compact data structure 300 allow for the increased relative accuracy of the compact data structure 300 in comparison to the GKArray and HDR histogram approaches.

Figure 11B:
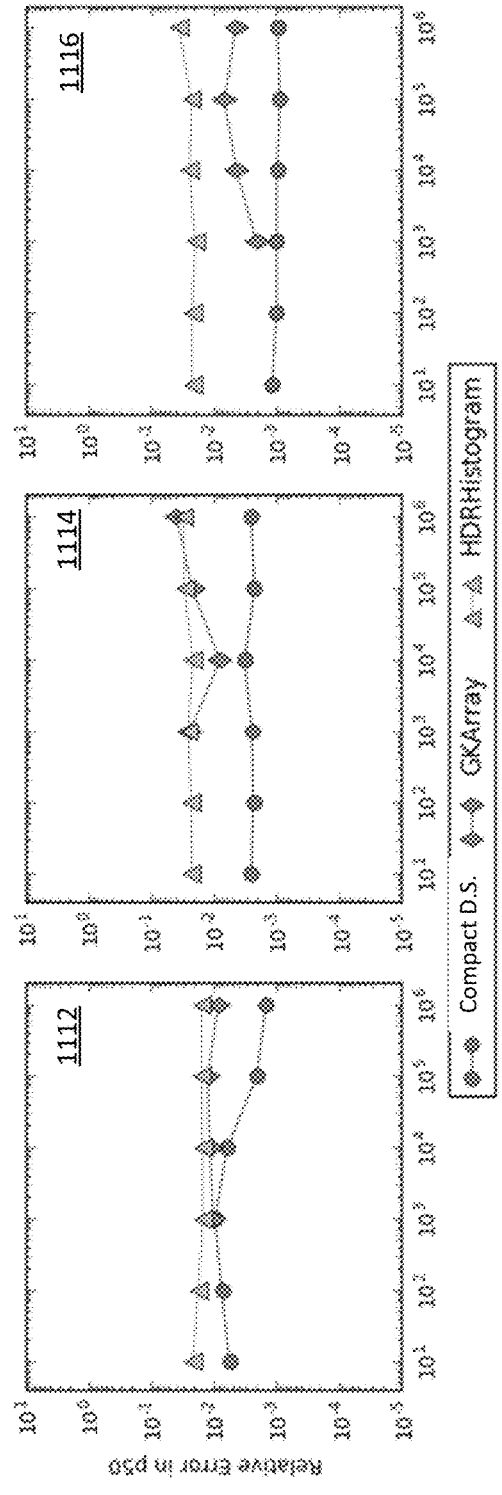

In FIG. 11B, the example results 1110 include relative error values for the compact data structure 300, GKArray, and HDR histogram for the 50th percentile values of the test data 900. Graph 1112 shows example results for the Pareto data 902, graph 1114 shows example results for the power data 904, and graph 1116 shows example results for the gas data 906. For each of graphs 1112, 1114, and 1116, the compact data structure 300 produces a summarization of the test data 900 that is approximately an order of magnitude less erroneous than the GKArray or the HDR histogram, though the accuracies of the three approaches briefly converge for the Pareto data 1112. As stated above, the dynamic range boundary values that are determined during the generation of the compact data structure 300 allow for the increased relative accuracy of the compact data structure 300 in comparison to the GKArray and HDR histogram approaches.

Figure 11C:
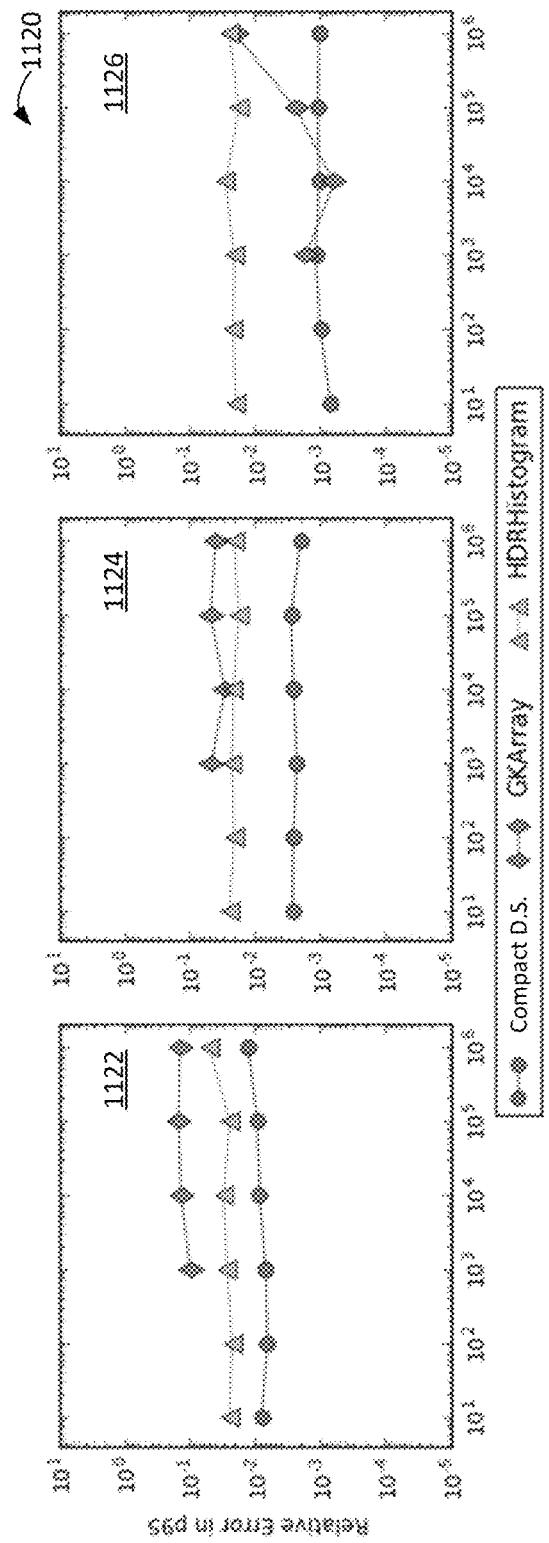

In FIG. 11C, the example results 1120 include relative error values for the compact data structure 300, GKArray, and HDR histogram for the 95th percentile values of the test data 900. Graph 1122 shows example results for the Pareto data 902, graph 1124 shows example results for the power data 904, and graph 1126 shows example results for the gas data 906. For each of graphs 1122, and 1124, the compact data structure 300 produces a summarization of the test data 900 that is less erroneous than the GKArray or the HDR histogram. While the compact data structure 300 has an error that is an order of magnitude smaller than the HDR histogram for graph 1126, the GKArray error is briefly converges to a similar value, though it is generally less accurate. As stated above, the dynamic range boundary values that are determined during the generation of the compact data structure 300 allow for the increased relative accuracy of the compact data structure 300 in comparison to the GKArray and HDR histogram approaches.

Figure 11D:
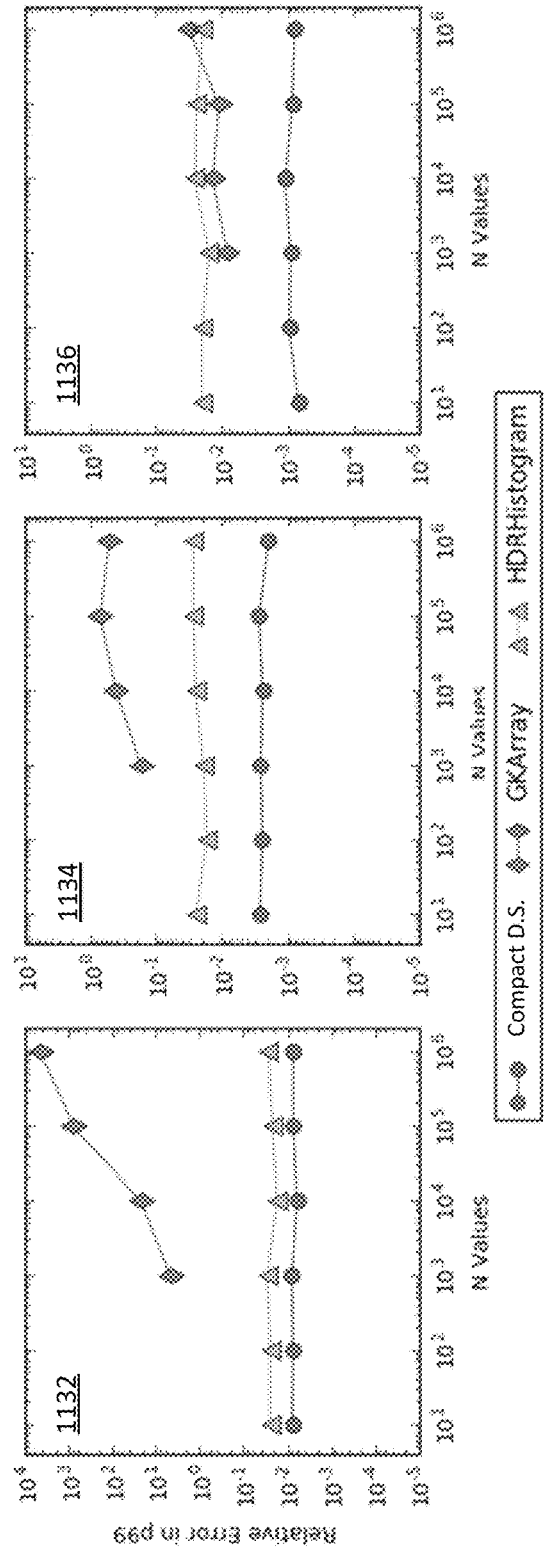

In FIG. 11D, the example results 1120 include relative error values for the compact data structure 300, GKArray, and HDR histogram for the 99th percentile values of the test data 900. As stated above, the compact data structure 300 handles the outlier values of the 99th percentile far more accurately than prior approaches. Graph 1132 shows example results for the Pareto data 902, graph 1134 shows example results for the power data 904, and graph 1136 shows example results for the gas data 906. For each of graphs 1132, and 1134, and 1136, the compact data structure 300 produces a summarization of the test data 900 that is less erroneous than the GKArray or the HDR histogram. As stated above, the dynamic range boundary values that are determined during the generation of the compact data structure 300 allow for the increased relative accuracy of the compact data structure 300 in comparison to the GKArray and HDR histogram approaches.

Though the compact data structure 300 is not optimized for rank accuracy but for relative accuracy, the compact data structure is still competitive in rank accuracy with prior approaches. FIGS. 12A-12D show examples of rank error results for different data summarization techniques at various percentiles when applied to the example data of FIG. 9.

Figure 12A:
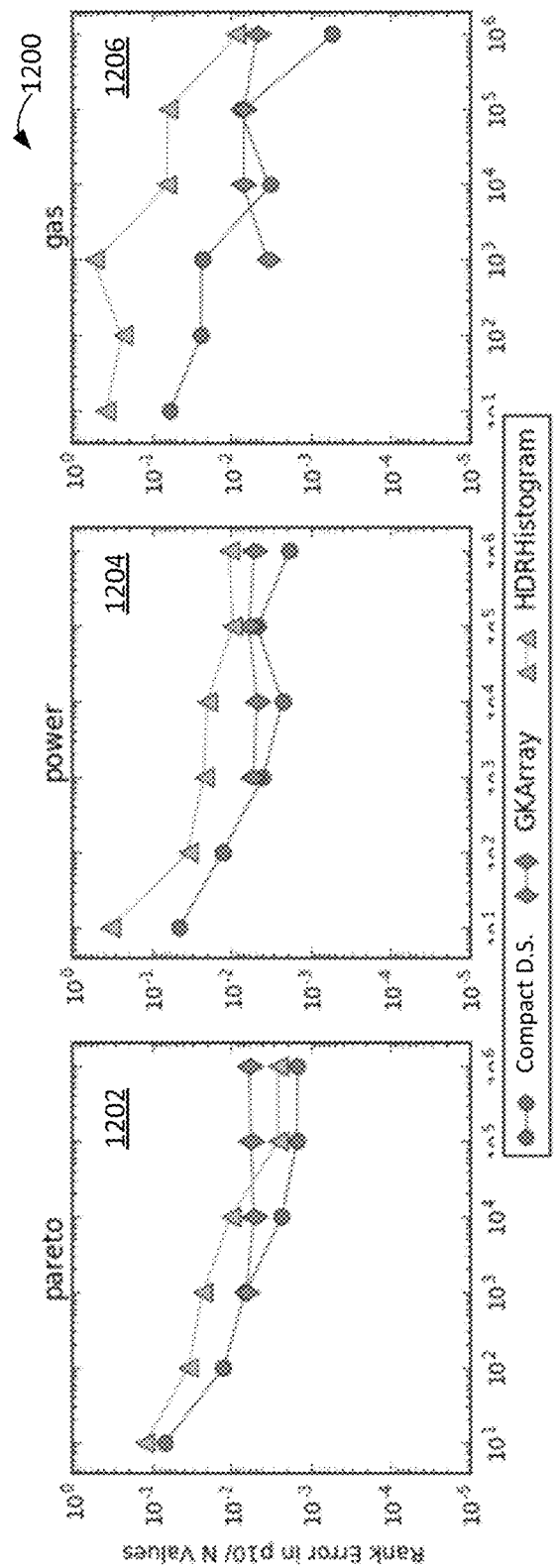
FIGS. 12A-12D show examples of rank error results for different data summarization techniques at various percentiles when applied to the example data of FIG. 9.

In FIG. 12A, the example results 1200 include rank error values for the compact data structure 300, GKArray, and HDR histogram for the 10th percentile values of the test data 900. Graph 1202 shows example results for the Pareto data 902, graph 1204 shows example results for the power data 904, and graph 1206 shows example results for the gas data 906. For each of graphs 1202, 1204, and 1206, the compact data structure 300 produces a summarization of the test data 900 that generally has smaller error values than the GKArray or the HDR histogram. As stated above, the dynamic range boundary values that are determined during the generation of the compact data structure 300 allow for the increased relative accuracy of the compact data structure 300 in comparison to the GKArray and HDR histogram approaches, but as shown in results 1200, this does not come at a cost to rank accuracy, and in fact, for the test data 900, the compact data structure 300 is slightly more accurate in rank approximation of the test data values.

Figure 12B:
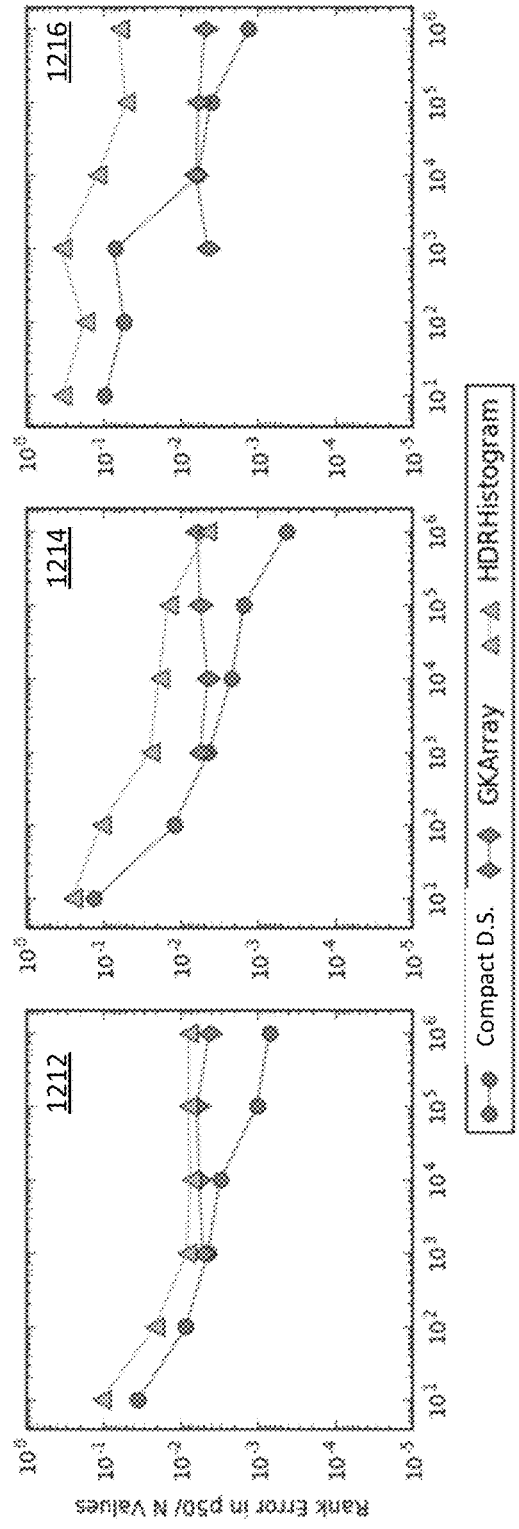

In FIG. 12B, the example results 1210 include rank error values for the compact data structure 300, GKArray, and HDR histogram for the 50th percentile values of the test data 900. Graph 1212 shows example results for the Pareto data 902, graph 1214 shows example results for the power data 904, and graph 1216 shows example results for the gas data 906. For each of graphs 1212, 1214, and 1216, the compact data structure 300 produces a summarization of the test data 900 that generally has smaller error values than the GKArray or the HDR histogram. As stated above, the dynamic range boundary values that are determined during the generation of the compact data structure 300 allow for the increased relative accuracy of the compact data structure 300 in comparison to the GKArray and HDR histogram approaches, but as shown in results 1210, this does not come at a cost to rank accuracy, and in fact, for the test data 900, the compact data structure 300 is slightly more accurate in rank approximation of the test data values.

Figure 12C:
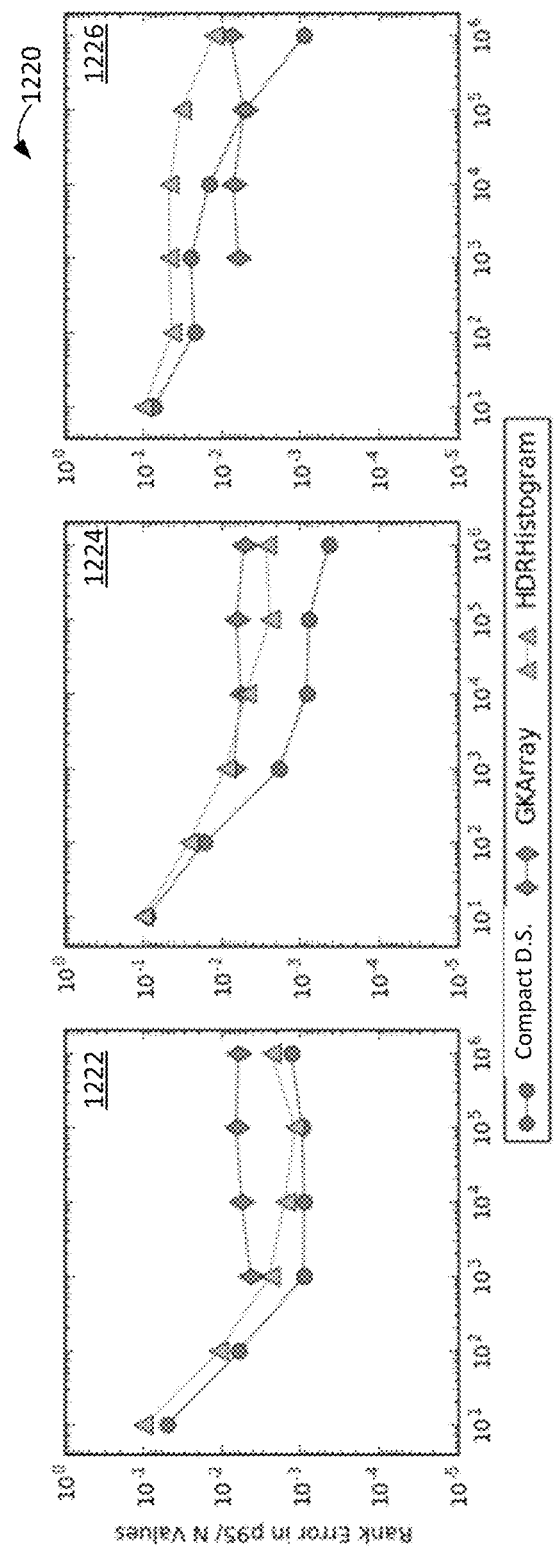

In FIG. 12C, the example results 1220 include rank error values for the compact data structure 300, GKArray, and HDR histogram for the 95th percentile values of the test data 900. Graph 1222 shows example results for the Pareto data 902, graph 1224 shows example results for the power data 904, and graph 1226 shows example results for the gas data 906. For each of graphs 1222, 1224, and 1226, the compact data structure 300 produces a summarization of the test data 900 that generally has smaller error values than the GKArray or the HDR histogram. As stated above, the dynamic range boundary values that are determined during the generation of the compact data structure 300 allow for the increased relative accuracy of the compact data structure 300 in comparison to the GKArray and HDR histogram approaches, but as shown in results 1220, this does not come at a cost to rank accuracy, and in fact, for the test data 900, the compact data structure 300 is slightly more accurate in rank approximation of the test data values.

Figure 12D:
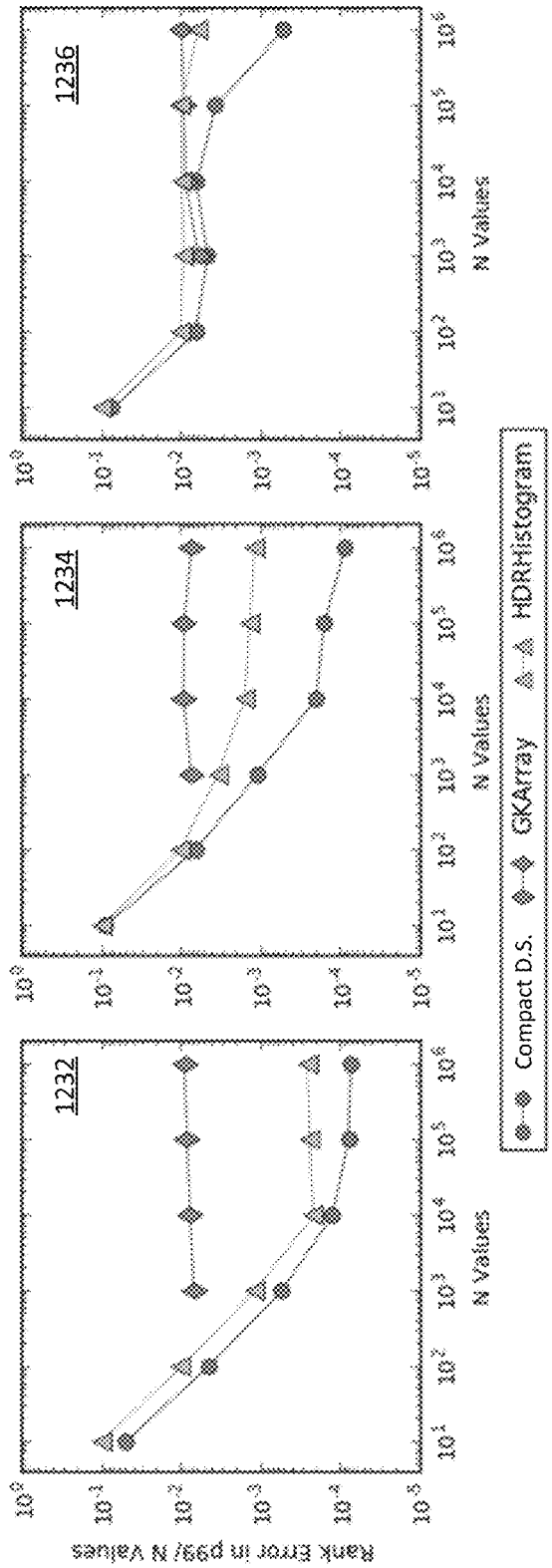

In FIG. 12D, the example results 1230 include rank error values for the compact data structure 300, GKArray, and HDR histogram for the 99th percentile values of the test data 900. Graph 1232 shows example results for the Pareto data 902, graph 1234 shows example results for the power data 904, and graph 1226 shows example results for the gas data 906. For each of graphs 1232, 1234, and 1236, the compact data structure 300 produces a summarization of the test data 900 that generally has smaller error values than the GKArray or the HDR histogram. As stated above, the dynamic range boundary values that are determined during the generation of the compact data structure 300 allow for the increased relative accuracy of the compact data structure 300 in comparison to the GKArray and HDR histogram approaches, but as shown in results 1230, this does not come at a cost to rank accuracy, and in fact, for the test data 900, the compact data structure 300 is slightly more accurate in rank approximation of the test data values.

Figure 13:
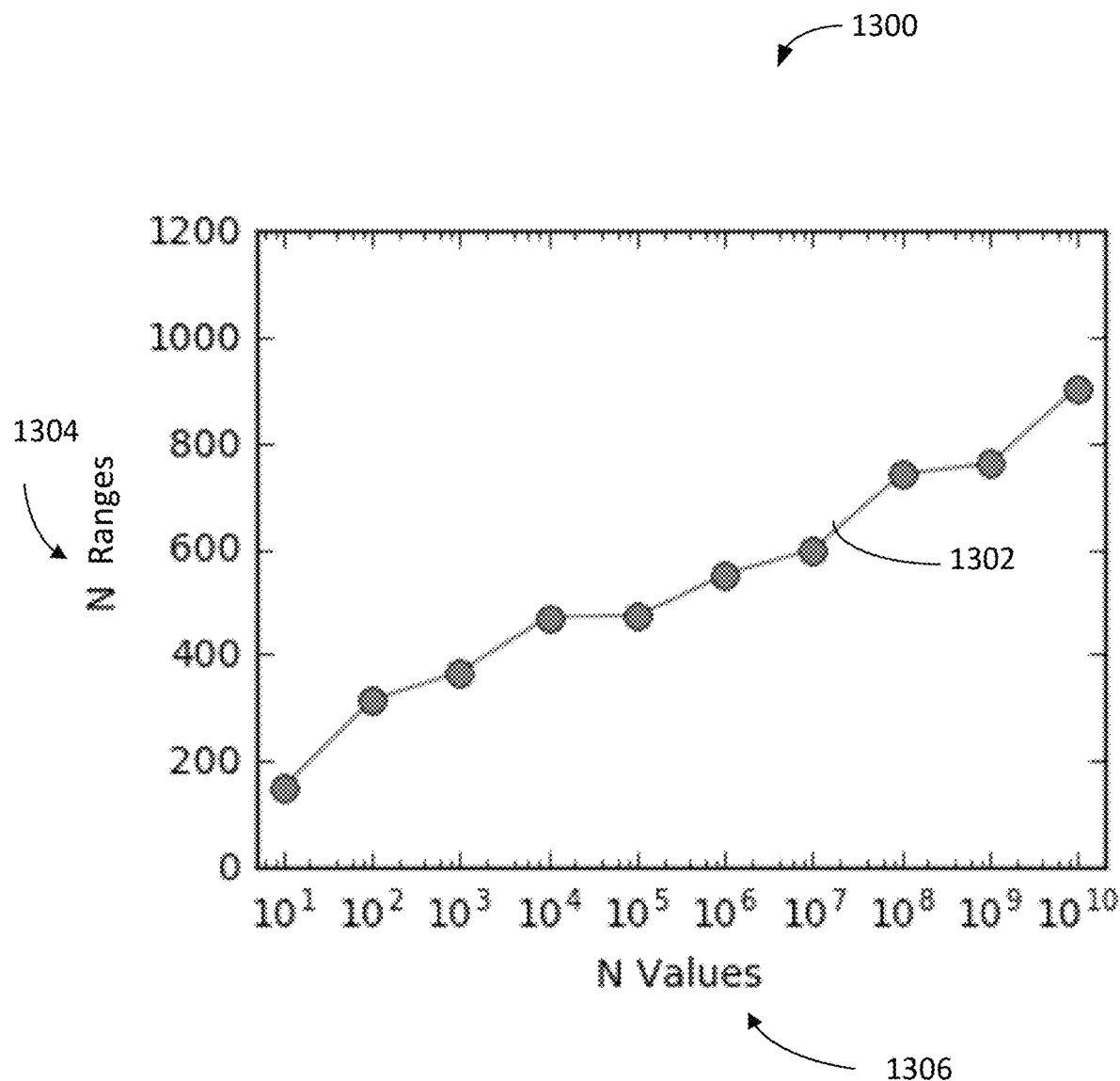
FIG. 13 shows an example relationship between the number of ranges and the number of values of a data sequence for the compact data structure.

Turning to FIG. 13 shows graph 1300 that shows an example relationship 1302 between a number 1304 of ranges for the compact data structure 300 and a number 1306 of values of a data sequence for the compact data structure. In this example, the Pareto data 902 was used to generate the graph 1300. As described above, in some implementations, the size of the compact data structure 300 (in terms of the number 1304 of ranges) relative to the number 1306 of values that are represented in the compact data structure increases according to a logarithmic ratio. For example, the compact data structure 300 may grow at a ratio of n:log(n), where n is the number 1306 of values in the performance data and where log(n) represents the number 1304 of ranges. In the example shown in graph 1300, the ratio is smaller than n:log(n). In some implementations, the ratio can be approximately n:nlog(n). In some implementations, other ratios are possible that are greater than n:log(n). For example, the ratio of the number 1304 of ranges to the number 1306 of values can be equal to or exceeding 500,000:1. As described above, for some distributions, the ratio can be capped by capping the number 1304 of ranges for the compact data structure 300 and merging the smallest ranges. This can ensure that the compact data structure 300 remains under a particular size for any distribution.

Figure 14:
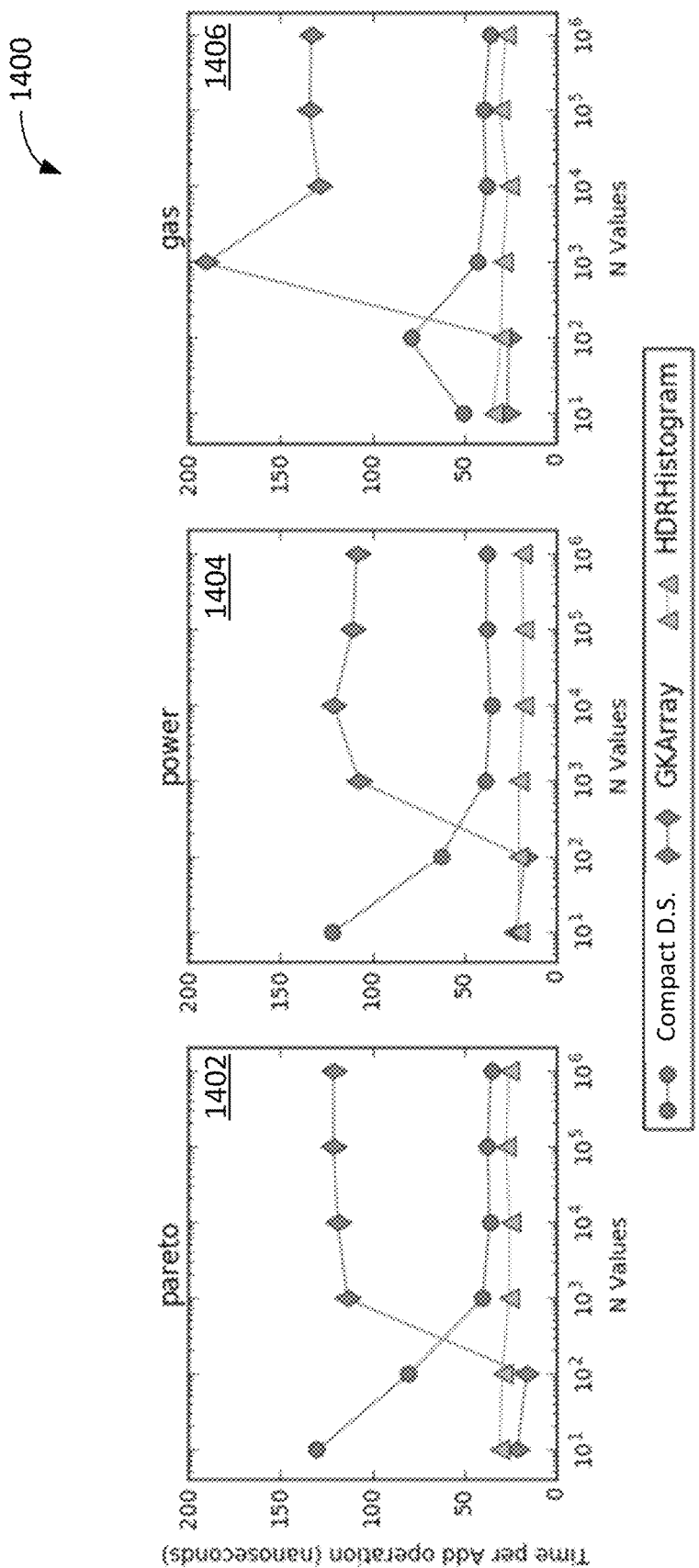
FIG. 14 shows examples of add operation times for compact data structure of varying sizes.

FIG. 14 shows example results 1400 of add operation times for compact data structure of varying sizes. More specifically, the results 1400 show the average time required to add n values to an empty data summary, divided by n. In an example, the time to add about one million values to the compact data structure 300 is about 40 milliseconds to add one million values to an empty compact data structure on a 3.1 GHz MacBook Pro, as measured speeds are hardware dependent. Results 1400 are example results to illustrate the relative performance of the compact data structure with respect to existing data summary approaches. HDR Histogram, described above, has fixed rather than dynamic ranges, which is faster than generating the compact data structure 300. However, generating the compact data structure 300 is 3-4 times faster than GKArray when n>1/ϵ. Adding up to 1/ϵ values in GK is very fast since no data summary takes place (all the values are retained).

Graph 1402 shows a comparison of add times for the compact data structure 300, HDR histogram, and GKArray for the Pareto data 902. Graph 1404 shows a comparison of add times for the compact data structure 300, HDR histogram, and GKArray for the power data 904. Graph 1406 shows a comparison of add times for the compact data structure 300, HDR histogram, and GKArray for the gas data 906. As shown in graphs 1402, 1404, and 1406, the speed of generating the compact data structure 300 is comparable to the HDR histogram for numbers of values above about 1000 (e.g., after almost all of the dynamic ranges of the compact data structure 300 are likely to have been defined). Thus, for practical applications, the compact data structure 300 takes a similar amount of time to generate as the HDR histogram having static ranges, but the compact data structure 300 also includes increased relative accuracy with respect to the HDR histogram, as described above in relation to FIGS. 11A-11D.

Figure 15:
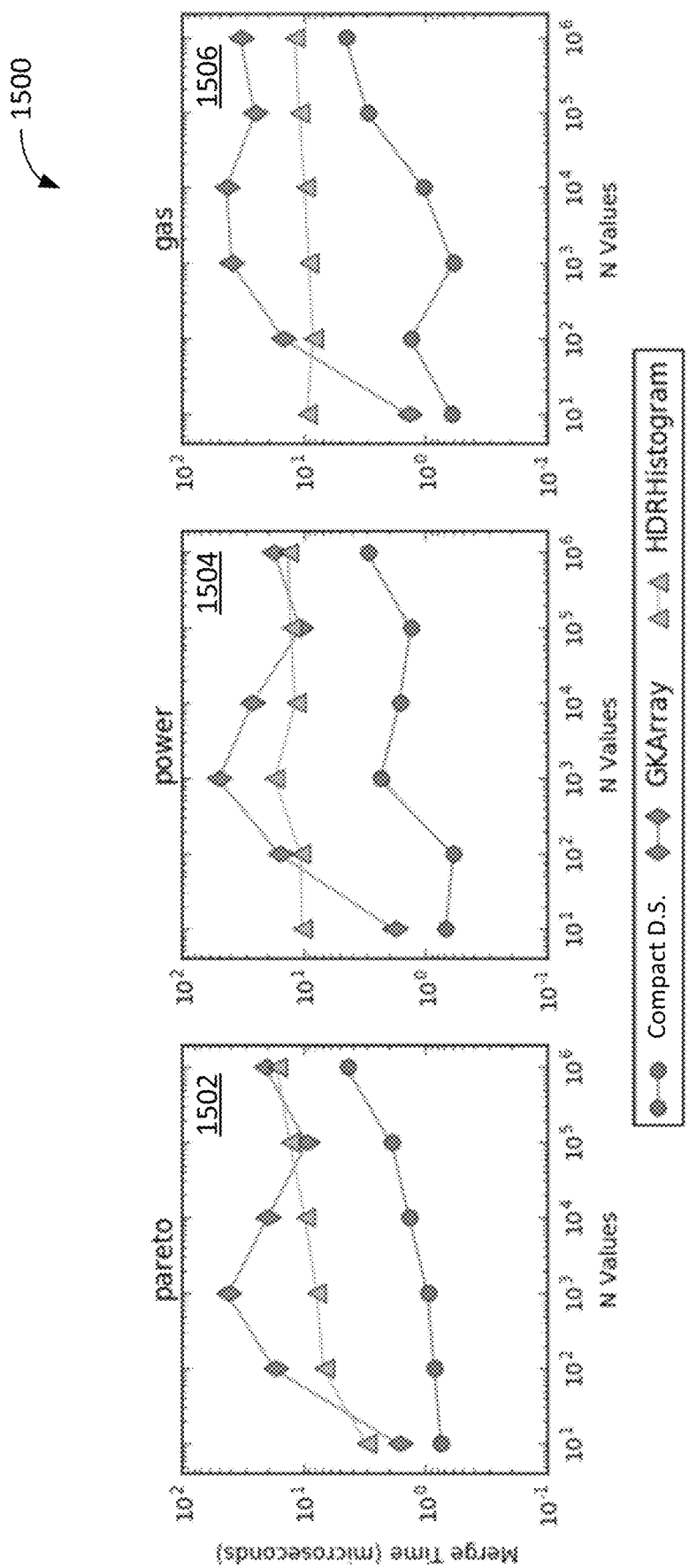
FIG. 15 shows examples of merge times for compact data structure of varying sizes.

FIG. 15 shows example results 1500 of merge times for compact data structures of varying sizes. More specifically, the results 1500 show the average time required to merge to instances of the compact data structure 300 (or other data summaries) together. Because the compact data structure 300 includes common range definitions for compact data structures with the same relative error threshold a, merging two compact data structures together is very fast: less than 5 microseconds to merge two compact data structures containing half a million values each. Results 1500 are example results to illustrate the relative performance of the compact data structure with respect to existing data summary approaches.

Graph 1502 shows a comparison of merge times for the compact data structure 300, HDR histogram, and GKArray for the Pareto data 902. Graph 1504 shows a comparison of merge times for the compact data structure 300, HDR histogram, and GKArray for the power data 904. Graph 1506 shows a comparison of merge times for the compact data structure 300, HDR histogram, and GKArray for the gas data 906. As shown in graphs 1502, 1504, and 1506, the speed of the merge is almost an order of magnitude faster than the HDR histogram and the GKArray approaches. The compact data structure 300 takes far less processing time to merge to instances, which increases performance of the server system 102 when the server system is aggregating many instances of the compact data structure from across the high-scale network (e.g., from computing systems 104a,b).

As described above, a monitoring system (e.g., a server system having a compact data structure generation engine 150) can obtain historical measurement data regarding a computer system, and use the historical measurement data to identify anomalous conditions associated with that computer system. For example, a monitoring system can obtain a sequence of data items pertaining to a particular computer system, each data item indicating a measured value of a particular performance metric of the computer system at a particular point in time in the past. Based on this information, the monitoring system can identify potentially anomalous conditions that occurred in the past and/or potentially anomalous conditions occurring in the present in connection with the computer system. This can be useful, for example, as it enables a user to identify potential issues that have occurred in connection with the computer system, and take a corrective action to address the issues.

In some cases, a monitoring system can obtain historical measurement data regarding a computer system, and use the historical measurement data to forecast future trends associated with the computer system. For example, a monitoring system can obtain a sequence of data items pertaining to a particular computer system, each data item indicating a measured value of a particular performance metric of the computer system at a particular point in time in the past. Based on this information, the monitoring system can estimate or forecast one or more future values of the performance metric at one or more particular points of time in the future. This can be useful, for example, as it enables a user to anticipate future changes in the performance metric, and identify potential issues before they actually occur. Accordingly, the user can take a proactive action to prevent or mitigate issues before the issues actually arise.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the server systems 102, the computer systems 104a and 104b, the engine 150, and the client computer systems 108a-c can be implemented using digital electronic circuitry, or in computer software, firmware, or hardware, or in combinations of one or more of them. In another example, the processes 700, 720, 740, 760, 780 can be implemented using digital electronic circuitry, or in computer software, firmware, or hardware, or in combinations of one or more of them.

Some implementations described in this specification (e.g., the database module 202, the transmission module 204, and the processing module 206) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, engine 150 comprises a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 16:
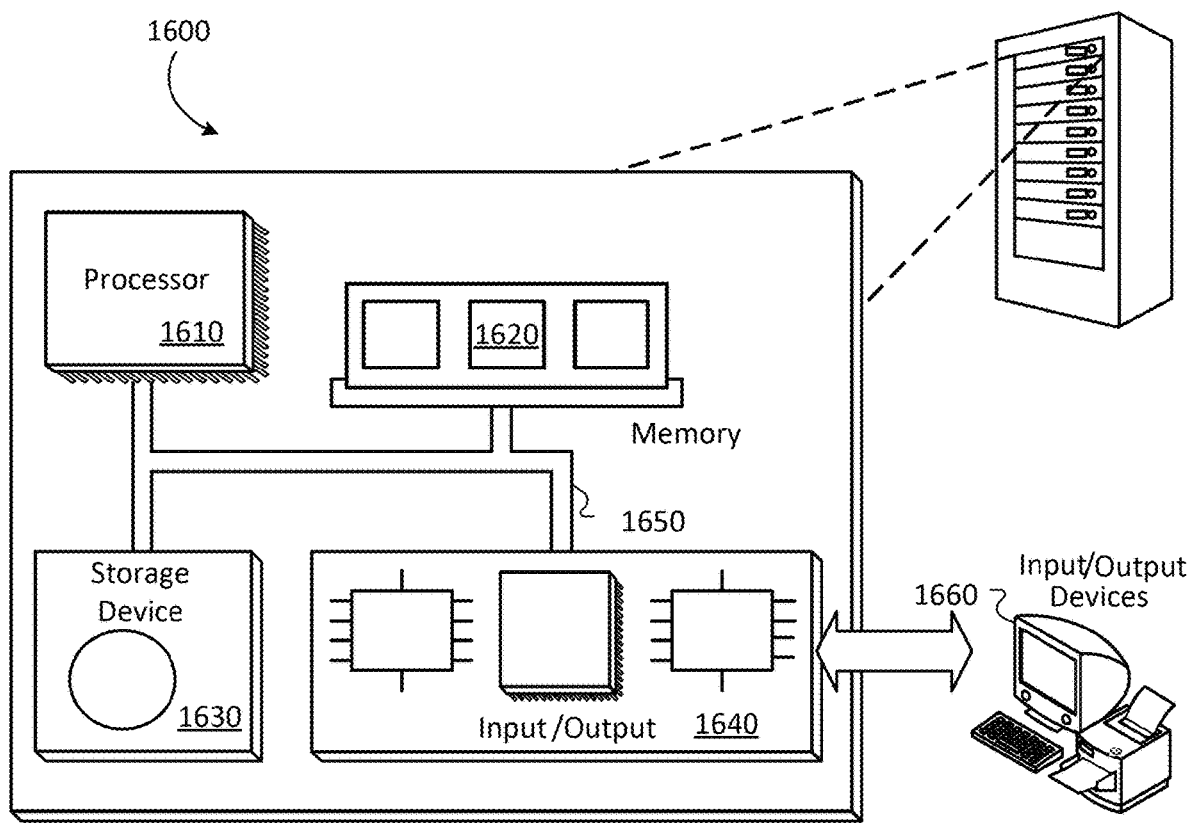
FIG. 16 is a diagram of an example computer system.

FIG. 16 shows an example computer system 1600 that includes a processor 1610, a memory 1620, a storage device 1630 and an input/output device 1640. Each of the components 1610, 1620, 1630 and 1640 can be interconnected, for example, by a system bus 1650. The processor 1610 is capable of processing instructions for execution within the system 1600. In some implementations, the processor 1610 is a single-threaded processor, a multi-threaded processor, or another type of processor. The processor 1610 is capable of processing instructions stored in the memory 1620 or on the storage device 1630. The memory 1620 and the storage device 1630 can store information within the system 1600.

The input/output device 1640 provides input/output operations for the system 1600. In some implementations, the input/output device 1640 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 1660. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the scope of the data processing system described herein. Accordingly, other embodiments are within the scope of the following claims.

What is claimed is:

1. A method of obtaining performance metrics for one or more computing devices, the method comprising:

receiving, at a server device, a computing performance data sequence from the one or more computing devices, the computing performance data sequence comprising a plurality of performance metric values that represent a performance metric associated with operations performed by the one or more computing devices;

generating, by the server device, a compact data structure representative of the computing performance data sequence and having an accuracy parameter α, wherein generating the compact data structure comprises:

for a first performance metric value in the plurality of performance metric values,
defining a first range, wherein boundaries of the first defined range are set as a function of different performance metric values including the first performance metric value, the function being based on the accuracy parameter α, and wherein an approximation of the first performance metric value is within an accuracy threshold defined by α,
defining a first index value associated with the first defined range, and
incrementing a first count value characterizing a number of performance metric values within the first defined range; and for each remaining performance metric value in the plurality of performance metric values,
identifying whether the remaining performance metric value is within an existing defined range,
when the remaining performance metric value is within the existing defined range,
incrementing a count value characterizing a number of performance metric values within the existing defined range, and
when the remaining performance metric value is not within any existing defined range,
defining a new range, wherein boundaries of the new defined range are set as a function of the remaining performance metric value,
defining a new index value associated with the new defined range,
incrementing a count value characterizing a number of performance metric values within the new defined range;
determining that a number of defined ranges of the compact data structure has reached a maximum number of defined ranges;
responsive to determining the number of defined ranges has reached the maximum, determining a first particular range having a smallest index value and a second particular range having a second smallest index value; and
combining the first particular range and the second particular range into a third particular range, wherein the combining comprises adding a first particular count of the first particular range to a second particular count of the second particular range to generate a third particular count associated with the third particular range;

storing the compact data structure in an electronic data storage device with less memory than would be required to store the computing performance data sequence;

deriving a statistical metric of the compact data structure; and outputting the statistical metric of the compact data structure as representative of performance of the one or more computing devices.

2. The method of claim 1, wherein each index value is defined as $\log_\gamma(x)$ for a corresponding performance metric value, x, and $\gamma=1+2\alpha$, and
wherein each range is defined as $\gamma^{\log_\gamma(x)-1} < x \leq \gamma^{\log_\gamma(x)}$.

3. The method of claim 1, wherein the statistical metric comprises one or more of a mean, a median, a mode, a quantile value, and a standard deviation of the plurality of performance metric values.

4. The method of claim 1, wherein the compact data structure is a first compact data structure, the method further comprising:

merging, by the server device, the first compact data structure with a second compact data structure having the accuracy parameter α, wherein merging comprises:
for each defined range of the first compact data structure that shares an index value with a defined range of the second compact data structure,
adding a first count value associated with the defined range of the first compact data structure to a second count value of the defined range of the second compact data structure to generate a third count value,
associating the third count value with the defined range of the first compact data structure, and
discarding the defined range of the second compact data structure.

5. The method of claim 4, wherein each of the first compact data structure and the second compact data structure comprises at least 500,000 values, and wherein the merging takes less than 5 μs.

6. The method of claim 1, further comprising:
determining a memory constraint of the electronic data storage device for storing the compact data structure; and
responsive to determining, setting a maximum number of defined ranges for the compact data structure.

7. The method of claim 1, wherein a ratio of a total number of performance metric values to a total number of distinct defined ranges in the compact data structure is greater than 500,000:1.

8. The method of claim 1, wherein the performance metric comprises a measure of server response time by the server device in response to requests for data by the one or more computing devices.

9. The method of claim 1, wherein the compact data structure is generated independent of identifying a performance metric value as a minimum or a maximum of the computing performance data sequence.

10. The method of claim 1, further comprising:
receiving a request for the statistical metric of the compact data structure; and
generating, for each index value of the compact data structure, a graphical representation of a count value associated with the respective index value.

11. The method of claim 1, wherein each defined range of the compact data structure is associated with a corresponding percentile rank value, the percentile rank value being determined based on the count value associated with each defined range.

12. The method of claim 11, further comprising:
receiving a request for a percentile rank of at least one performance metric value; and
generating a graphical representation comprising the percentile rank value.

13. The method of claim 1, wherein storing the compact data structure in the electronic data storage device with less memory than would be required to store the computing performance data sequence comprises a reduction in memory corresponding to a ratio of n:log(n), wherein n is a number of the performance metric values.

14. A computing system for obtaining performance metrics for one or more computing devices, the system comprising:
a server device configured for receiving a computing performance data sequence from the one or more computing devices, the computing performance data sequence comprising a plurality of performance metric values that represent a performance metric associated with operations performed by the one or more computing devices;
a compact data structure generation engine configured to generate a compact data structure representative of the computing performance data sequence and having an accuracy parameter $\alpha$, wherein generating the compact data structure comprises:
for a first performance metric value in the plurality of performance metric values,
defining a first range, wherein boundaries of the first defined range are set as a function of different performance metric values including the first performance metric value, the function being based on the accuracy parameter $\alpha$, and wherein an approximation of the first performance metric value is within an accuracy threshold defined by $\alpha$,
defining a first index value associated with the first defined range and based on the accuracy parameter $\alpha$, and
incrementing a first count value characterizing a number of performance metric values within the first defined range; and
for each remaining performance metric value in the plurality of performance metric values,
identifying whether the remaining performance metric value is within an existing defined range,
when the remaining performance metric value is within the existing defined range,
incrementing a count value characterizing a number of performance metric values within the existing defined range, and when the remaining performance metric value is not within any existing defined range,
defining a new range, wherein boundaries of the new defined range are set as a function of the remaining performance metric value,
defining a new index value associated with the new defined range,
incrementing a count value characterizing a number of performance metric values within the new defined range;
determining that a number of defined ranges of the compact data structure has reached a maximum number of defined ranges;
responsive to determining the number of defined ranges has reached the maximum, determining a first particular range having a smallest index value and a second particular range having a second smallest index value; and
combining the first particular range and the second particular range into a third particular range, wherein the combining comprises adding a first particular count of the first particular range to a second particular count of the second particular range to generate a third particular count associated with the third particular range;
a storage configured for storing the compact data structure in an electronic data storage device with less memory than would be required to store the computing performance data sequence;
wherein the server device is further configured to derive a statistical metric of the compact data structure; and
wherein the server device is further configured to output the statistical metric of the compact data structure as representative of performance of the one or more computing devices.

15. The system of claim 14, wherein storing the compact data structure in the electronic data storage device with less memory than would be required to store the computing performance data sequence comprises a reduction in memory corresponding to a ratio of n:log(n), wherein n is a number of the performance metric values.

16. The system of claim 14, wherein each index value is defined as $\log_\gamma(x)$ for a corresponding performance metric value, x, and $\gamma=1+2\alpha$, and
wherein each range is defined as $\gamma^{\log_\gamma(x)-1} < x \leq \gamma^{\log_\gamma(x)}$.

17. The system of claim 14, wherein the statistical metric comprises one or more of a mean, a median, a mode, a quantile value, and a standard deviation of the plurality of performance metric values.

18. The system of claim 14, wherein the compact data structure is a first compact data structure, wherein the server device is configured to merge the first compact data structure with a second compact data structure having the accuracy parameter $\alpha$, wherein merging comprises:
   for each defined range of the first compact data structure that shares an index value with a defined range of the second compact data structure,
      adding a first count value associated with the defined range of the first compact data structure to a second count value of the defined range of the second compact data structure to generate a third count value,
      associating the third count value with the defined range of the first compact data structure, and
      discarding the defined range of the second compact data structure.

19. The system of claim 18, wherein each of the first compact data structure and the second compact data structure comprises at least 500,000 values, and wherein the merging takes less than 5 µs.

20. The system of claim 14, wherein the server device is configured to perform operations comprising:
   determining a memory constraint of the storage for storing the compact data structure; and
   responsive to determining, setting a maximum number of defined ranges for the compact data structure.

21. The system of claim 14, wherein the server device is configured to perform operations comprising:
   determining that a number of defined ranges of the compact data structure has reached a maximum number of defined ranges;
   responsive to determining the number of defined ranges has reached the maximum, determining a first particular range having a smallest index value and a second particular range having a second smallest index value;
   combining the first particular range and the second particular range into a third particular range, wherein the combining comprises adding a first particular count of the first particular range to a second particular count of the second particular range to generate a third particular count associated with the third particular range.

22. The system of claim 14, wherein a ratio of a total number of performance metric values to a total number of distinct defined ranges in the compact data structure is greater than 500,000:1.

23. The system of claim 14, wherein the first performance metric value comprises a measure of server response time by the server device in response to requests for data by the one or more computing devices.

24. The system of claim 14, wherein the compact data structure is generated independent of identifying a performance metric value as a minimum or a maximum of the computing performance data sequence.

25. The system of claim 14, wherein the server device is configured to perform operations comprising:
   receiving a request for the statistical metric of the compact data structure; and
   generating, for each index value of the compact data structure, a graphical representation of a count value associated with the respective index value.

26. The system of claim 14, wherein each defined range of the compact data structure is associated with a corresponding percentile rank value, the percentile rank value being determined based on the count value associated with each defined range.

27. The system of claim 26, wherein the server device is configured to perform operations comprising:
   receiving a request for a percentile rank of at least one performance metric value; and
   generating a graphical representation comprising the percentile rank value.

28. One or more non-transitory computer readable media storing instructions that are executable by one or more processors configured to perform operations comprising:
   receiving a computing performance data sequence from the one or more computing devices, the computing performance data sequence comprising a plurality of performance metric values that represent a performance metric associated with operations performed by the one or more computing devices;
   generating a compact data structure representative of the computing performance data sequence and having an accuracy parameter $\alpha$, wherein generating the compact data structure comprises:
      for a first performance metric value in the plurality of performance metric values,
         defining a first range, wherein boundaries of the first defined range are set as a function of different performance metric values including the first performance metric value, the function being based on the accuracy parameter $\alpha$, and wherein an approximation of the first performance metric value is within an accuracy threshold defined by $\alpha$,
         defining a first index value associated with the first defined range, and
         incrementing a first count value characterizing a number of performance metric values within the first defined range; and
      for each remaining performance metric value in the plurality of performance metric values,
         identifying whether the remaining performance metric value is within an existing defined range,
      when the remaining performance metric value is within the existing defined range,
         incrementing a count value characterizing a number of performance metric values within the existing defined range, and
      when the remaining performance metric value is not within any existing defined range,
         defining a new range, wherein boundaries of the new defined range are set as a function of the remaining performance metric value,
         defining a new index value associated with the new defined range, and
         incrementing a count value characterizing a number of performance metric values within the new defined range,
         determining that a number of defined ranges of the compact data structure has reached a maximum number of defined ranges,
         responsive to determining the number of defined ranges has reached the maximum, determining a first particular range having a smallest index value and a second particular range having a second smallest index value, and
         combining the first particular range and the second particular range into a third particular range, wherein the combining comprises adding a first particular count of the first particular range to a second particular count of the second particular range to generate a third particular count associated with the third particular range;

storing the compact data structure with less memory than would be required to store the computing performance data sequence;

deriving a statistical metric of the compact data structure; and outputting the statistical metric of the compact data structure as representative of performance of the one or more computing devices.

29. A method of obtaining server response time metrics for one or more computing devices networked to a server device, the method comprising:

receiving, at the server device, a plurality of response times from the one or more computing devices, each response time comprising a corresponding measure of time that the server device takes to respond to a request for data;

generating, by the server device, a compact data structure representative of the plurality of response times and having an accuracy parameter $\alpha$, wherein generating the compact data structure comprises:

for a first response time in the plurality of response times, defining a first range, wherein boundaries of the first defined range are set as a function of different performance metric values including the first response time, the function being based on the accuracy parameter $\alpha$, and wherein an approximation of the first response time is within an accuracy threshold defined by $\alpha$, defining a first index value associated with the first defined range, and incrementing a first count value characterizing a number of response times within the first defined range; and for each remaining response time in the plurality of response times, identifying whether the remaining response time is within an existing defined range, when the remaining time value is within the existing defined range, incrementing a count value characterizing a number of response times that are within the existing defined range, and when the remaining response time is not within any existing defined range, defining a new range, wherein boundaries of the new defined range are set as a function of the remaining response time, defining a new index value associated with the new defined range, and incrementing a count value characterizing a number of response times within the new defined range;

determining that a number of defined ranges of the compact data structure has reached a maximum number of defined ranges, responsive to determining the number of defined ranges has reached the maximum, determining a first particular range having a smallest index value and a second particular range having a second smallest index value, and combining the first particular range and the second particular range into a third particular range, wherein the combining comprises adding a first particular count of the first particular range to a second particular count of the second particular range to generate a third particular count associated with the third particular range;

storing the compact data structure in an electronic data storage device with less memory than would be required to store the plurality of response times;

deriving a statistical metric of the compact data structure; and outputting the statistical metric of the compact data structure as representative of performance server device.

* * * * *